(12) United States Patent
Lerner et al.

(10) Patent No.: US 7,357,501 B2
(45) Date of Patent: *Apr. 15, 2008

(54) ADJUSTABLE TENSIONING SYSTEM FOR RIMLESS EYEWEAR

(76) Inventors: Ira S. Lerner, 171 Spring St., 2nd Floor, New York, NY (US) 10013; Lewis Chan, House 15 Casa Marina One, 28 Lo Fai Road, Tai Po, NT (HK)

( * ) Notice: Subject to any disclaimer, the term of this patent is extended or adjusted under 35 U.S.C. 154(b) by 0 days.

This patent is subject to a terminal disclaimer.

(21) Appl. No.: 11/453,337

(22) Filed: Jun. 14, 2006

(65) Prior Publication Data

US 2007/0024804 A1 Feb. 1, 2007

Related U.S. Application Data

(63) Continuation of application No. 10/846,349, filed on May 14, 2004, now Pat. No. 7,063,420.

(51) Int. Cl.
*G02C 1/08* (2006.01)
(52) U.S. Cl. .......................... 351/92; 351/106
(58) Field of Classification Search ................ 351/92, 351/106, 90, 103, 96, 99, 100, 124, 135, 351/41
See application file for complete search history.

(56) References Cited

U.S. PATENT DOCUMENTS

| | | | |
|---|---|---|---|
| 188,246 A | 3/1877 | Johnson | |
| 1,358,200 A | 11/1920 | Hansen | |
| 1,679,233 A | 7/1928 | Strauss | |
| 1,907,749 A | 5/1933 | Dechau | |
| 1,936,319 A | 11/1933 | Wingate | |
| 2,065,122 A | 12/1936 | Diggins | |
| 2,141,063 A | 12/1938 | Euler | |
| 2,254,637 A | 9/1941 | Welsh | |
| 2,492,072 A | 12/1949 | Tapner | |
| D170,435 S | 9/1953 | Weissman | |
| 2,737,847 A | 5/1956 | Tesauro | |
| 2,770,168 A | 11/1956 | Tesauro | |
| 3,498,701 A | 3/1970 | Miller | |
| 3,531,118 A | 9/1970 | Mabie et al. | |

(Continued)

FOREIGN PATENT DOCUMENTS

CH 572 222 1/1976

(Continued)

OTHER PUBLICATIONS

International Glasses Design Competition '93 Japan, Issued on Oct. 5, 1993, pp. 22,30,32,33,36,40,49,50,70.

(Continued)

*Primary Examiner*—Hung X. Dang
(74) *Attorney, Agent, or Firm*—Knobbe, Martens, Olson & Bear, LLP

(57) ABSTRACT

Eyewear has a wire that encircles each of a pair of lenses respectively. A tensioning assembly can adjust and tension the wire. Two variations of tensioning assemblies are shown. One tensioning assembly has a spool on which a portion of the wire is wound. Another tensioning assembly has an insert that pulls a portion of the wire inwardly within a projection that extends outward from the lens.

16 Claims, 20 Drawing Sheets

U.S. PATENT DOCUMENTS

| | | | |
|---|---|---|---|
| 3,531,188 A | 9/1970 | Leblanc et al. |
| 3,531,190 A | 9/1970 | Leblanc |
| 3,565,517 A | 2/1971 | Gitlin et al. |
| 3,582,192 A | 6/1971 | Gitlin |
| D221,480 S | 8/1971 | Tagnou |
| 3,838,914 A | 10/1974 | Fernandez |
| 4,021,892 A | 5/1977 | Piper |
| 4,070,103 A | 1/1978 | Meeker |
| 4,196,981 A | 4/1980 | Waldrop |
| 4,380,379 A | 4/1983 | Ahern et al. |
| 4,432,616 A | 2/1984 | Kurosaka |
| 4,466,713 A | 8/1984 | Tanaka |
| 4,523,819 A | 6/1985 | Dianitsch et al. |
| 4,547,909 A | 10/1985 | Bell |
| 4,685,782 A | 8/1987 | Lhospice |
| D291,808 S | 9/1987 | Meyerspeer |
| 4,822,158 A | 4/1989 | Porche |
| 4,878,749 A | 11/1989 | McGee |
| D307,756 S | 5/1990 | Porsche |
| 4,958,923 A | 9/1990 | Rosenson |
| 4,958,924 A | 9/1990 | Parker |
| 4,973,148 A | 11/1990 | Gazeley |
| 4,988,181 A | 1/1991 | Riach, Jr. |
| 5,048,944 A | 9/1991 | Porsche |
| 5,162,824 A | 11/1992 | Klemka |
| 5,181,051 A | 1/1993 | Townsend et al. |
| 5,243,366 A | 9/1993 | Blevins |
| 5,321,442 A | 6/1994 | Albanese |
| 5,355,184 A | 10/1994 | Varveris et al. |
| 5,371,554 A | 12/1994 | Aspesi |
| 5,389,981 A | 2/1995 | Riach, Jr. |
| 5,410,763 A | 5/1995 | Bollé |
| 5,416,537 A | 5/1995 | Sadler |
| 5,423,712 A | 6/1995 | Underwood et al. |
| 5,428,407 A | 6/1995 | Sheffield |
| 5,431,595 A | 7/1995 | Underwood |
| D371,567 S | 7/1996 | Fukuchi |
| 5,568,207 A | 10/1996 | Chao |
| 5,592,243 A | 1/1997 | Chao |
| 5,642,177 A | 6/1997 | Nishioka |
| 5,654,785 A | 8/1997 | Shih et al. |
| 5,663,780 A | 9/1997 | Murai et al. |
| 5,684,558 A | 11/1997 | Hamamoto |
| 5,710,614 A | 1/1998 | Cereda |
| 5,724,118 A | 3/1998 | Krebs |
| 5,737,054 A | 4/1998 | Chao |
| 5,867,244 A | 2/1999 | Martin |
| 5,889,574 A | 3/1999 | Gandl-Schiller |
| 5,912,718 A | 6/1999 | Murai et al. |
| 5,914,768 A | 6/1999 | Hyoi |
| 6,027,214 A | 2/2000 | Graham |
| 6,089,706 A | 7/2000 | Pilat, Jr. |
| 6,099,119 A | 8/2000 | Kim |
| 6,139,142 A | 10/2000 | Zelman |
| 6,149,269 A | 11/2000 | Madison |
| 6,264,325 B1 | 7/2001 | Peressini et al. |
| 6,264,326 B1 | 7/2001 | Hyoi |
| 6,343,858 B1 | 2/2002 | Zelman |
| 6,588,897 B1 | 7/2003 | Nadler et al. |
| 6,595,634 B1 | 7/2003 | Pilat, Jr. |
| 7,063,420 B2 * | 6/2006 | Lerner et al. ............... 351/92 |
| 2005/0007546 A1 | 1/2005 | Pilat et al. |

FOREIGN PATENT DOCUMENTS

| | | |
|---|---|---|
| CN | 1117593 | 2/1996 |
| DE | 17 97 366 | 1/1971 |
| DE | 85 07 761 U1 | 5/1985 |
| DE | 34 13 827 A1 | 8/1985 |
| DE | 88 06 898 U1 | 10/1988 |
| DE | 39 05 041 A1 | 8/1990 |
| DE | 39 19 489 A1 | 12/1990 |
| DE | 39 20 879 A1 | 1/1991 |
| DE | 39 21 987 A1 | 1/1991 |
| DE | 39 33 310 A1 | 1/1991 |
| DE | 92 16 919 U1 | 4/1993 |
| DE | 43 16 698 A1 | 11/1994 |
| DE | 295 18 590 | 11/1995 |
| DE | 295 16 670 U1 | 5/1996 |
| EP | 0 469 699 A1 | 5/1992 |
| EP | 0 502 796 B1 | 9/1992 |
| EP | 0 743 545 A1 | 11/1996 |
| EP | 0 955 560 A1 | 11/1999 |
| FR | 915421 | 11/1946 |
| FR | 1037755 | 9/1953 |
| FR | 1061253 | 4/1954 |
| FR | 1266652 | 6/1961 |
| FR | 2 483 632 | 4/1981 |
| FR | 2 657 436 A1 | 7/1991 |
| GB | 812880 | 5/1959 |
| GB | 846425 | 8/1960 |
| GB | 855268 | 11/1960 |
| JP | 56-072983 | 5/1956 |
| JP | 44-15392 | 7/1969 |
| JP | 54-111841 | 9/1979 |
| JP | 54-111842 | 9/1979 |
| JP | 54-163052 | 12/1979 |
| JP | 55-50217 | 4/1980 |
| JP | 55-083022 | 6/1980 |
| JP | 55-133014 | 10/1980 |
| JP | 55-135814 | 10/1980 |
| JP | 56-29209 | 3/1981 |
| JP | 56-095214 | 8/1981 |
| JP | 56-153317 | 11/1981 |
| JP | 57-178215 | 11/1982 |
| JP | 57-184910 | 11/1982 |
| JP | 60-146217 | 8/1985 |
| JP | 61-2621 | 1/1986 |
| JP | 63-188626 | 8/1988 |
| JP | 1-136114 | 5/1989 |
| JP | 5-157997 | 6/1993 |
| JP | 05-196899 | 8/1993 |
| JP | 5-40493 | 10/1993 |
| JP | 05-289029 | 11/1993 |
| JP | 06-265828 | 9/1994 |
| JP | 06-331943 | 12/1994 |
| JP | 07-028001 | 1/1995 |
| JP | 7-10722 | 2/1995 |
| JP | 07-056123 | 3/1995 |
| JP | 7-128620 | 5/1995 |
| JP | 07-244259 | 9/1995 |
| JP | 08-050263 | 2/1996 |
| JP | 274588 | 4/1996 |
| JP | 09-043544 | 2/1997 |
| JP | 09-061754 | 3/1997 |
| JP | 9-101489 | 4/1997 |
| JP | 7-156856 | 8/1997 |
| JP | 2000-122001 | 4/2000 |
| JP | 2001-166266 | 6/2001 |
| JP | 2002-031783 | 1/2002 |
| RU | 220885 | 9/1968 |
| WO | WO 90/09611 | 8/1990 |
| WO | WO 95/18986 | 7/1995 |
| WO | WO 95/23995 | 8/1995 |
| WO | WO 99/42890 | 8/1999 |
| WO | WO 03/040809 | 5/2003 |

OTHER PUBLICATIONS

New Product Announcement Supporting Material Q & A of Pentax Magnet Eyeglass Frame; Oct. 1995; Pentax Vision Co., Ltd & Hoya Corp.

Aspen Booth #1570 Ad.; Aspex—memoflex®, EASYCLIP™.

Rex-Oval Frame Drawing; Jan. 5, 1994; SUNREEVE.

TAKUMI-Oval Frame and Lens Designs Brochure; Sunreeve Co., Ltd.: "Takumi-Oval" series.

Pentax Vision Co., Ltd.; Oct. 3, 1995; Pentax Magnet Eyeglass Frames.

Twin Come Catalog Advertisement; Nov. 1995; They Change From Glasses to Sunglasses with One Touch; 5 pages.

Translation of DE 88 06 898; Oct. 27, 1988; Magnetic Spectacle Frame and Magnetic Attachment Lens Piece.

Japanese Patent Office Patent Journal; Kokai Utility Model No. SHO 61[1986]-2621; Jan. 9, 1986; Glasses Having Lenses Capable of Insertion and Removal.

Color photos of eyewear; 4 photos.

Baltimore Business Publications, Inc. 1995; Jul. 28, 1995; Copyright 1995; vol. 13; No. 10; Sec. 1; p. 2; Magnetic sunglasses by Chameez Inc, of Baltimore; 1 page.

PR Newswire Association, Inc.; Copyright 1995; Jul. 27, 1995; Section: Financial News; Magnetic Sunglasses, Chameez, Inc., Baltimore, MD; 2 pages.

* cited by examiner

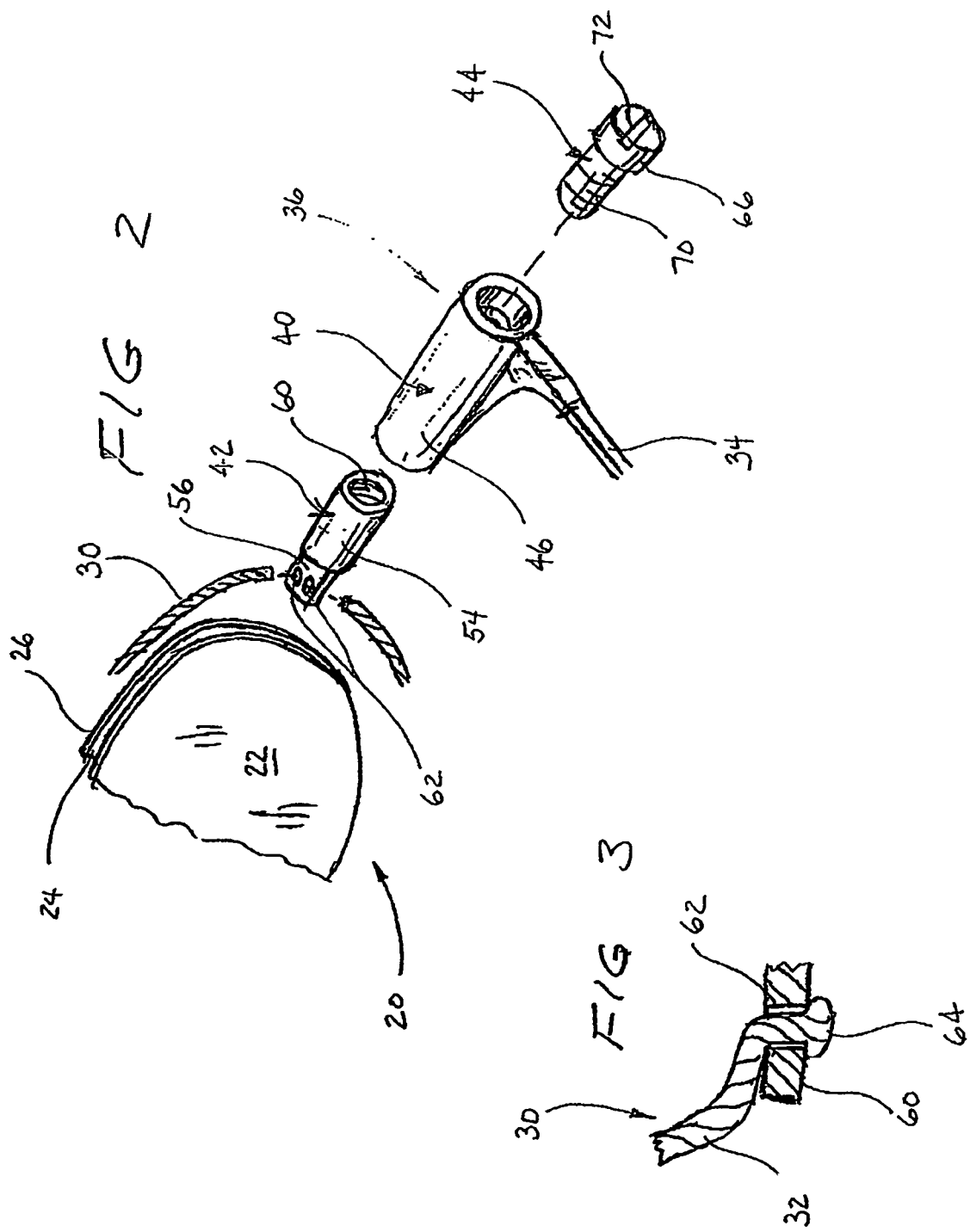

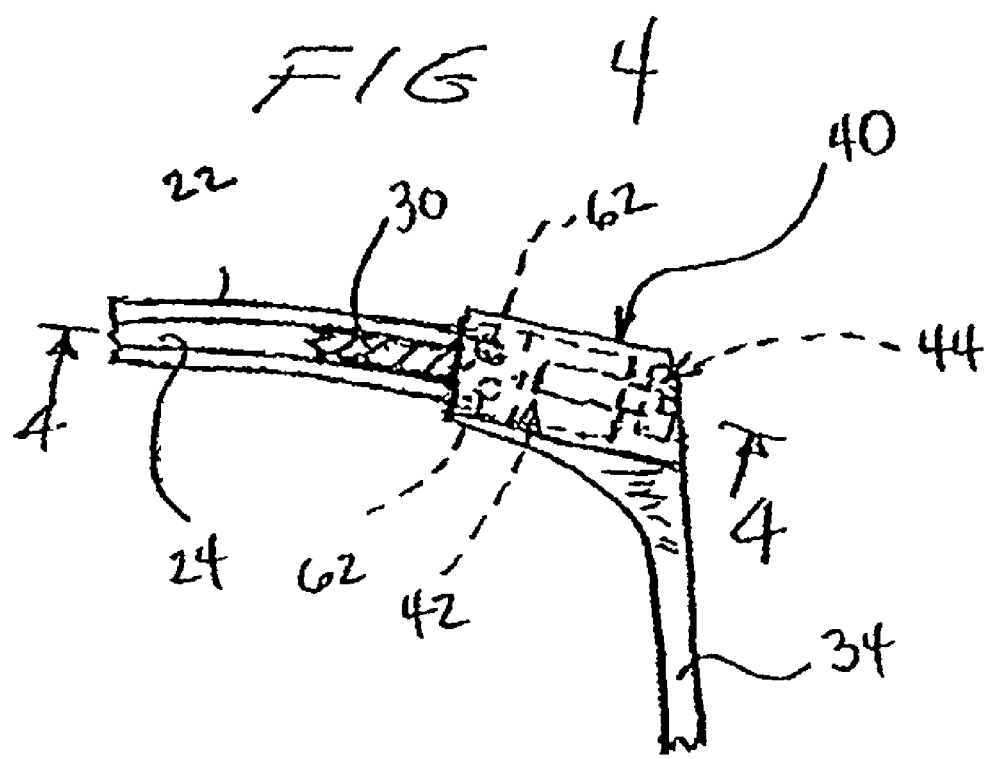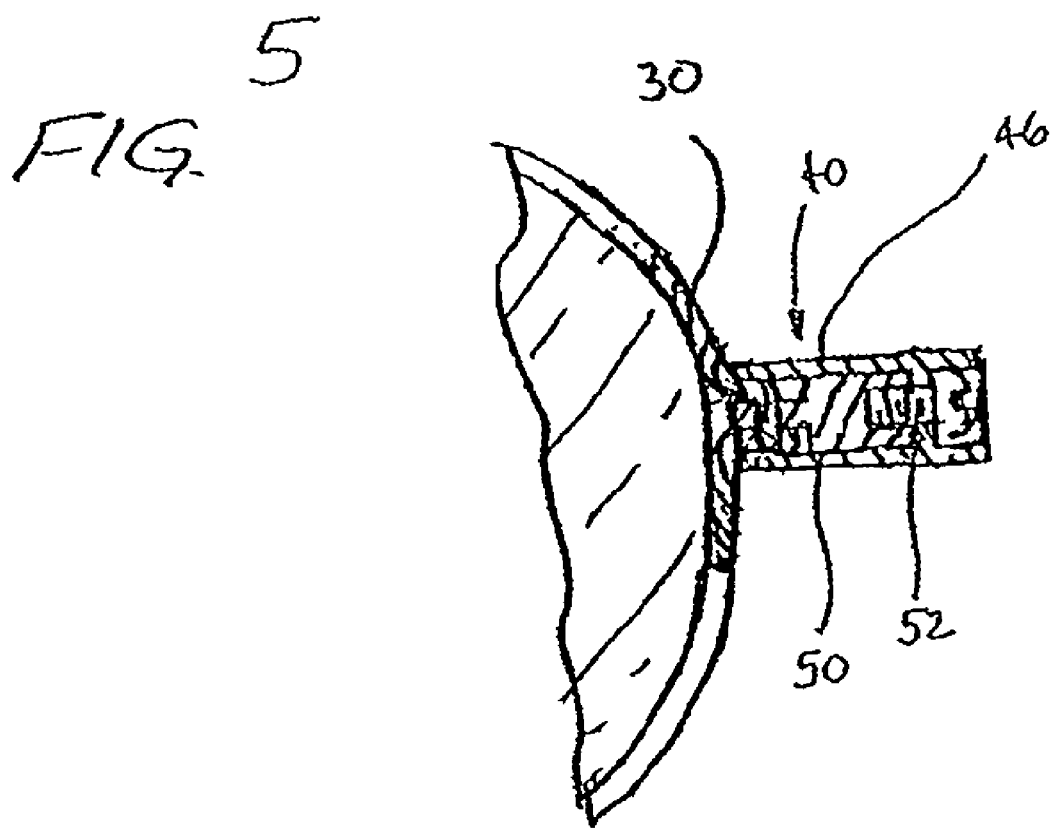

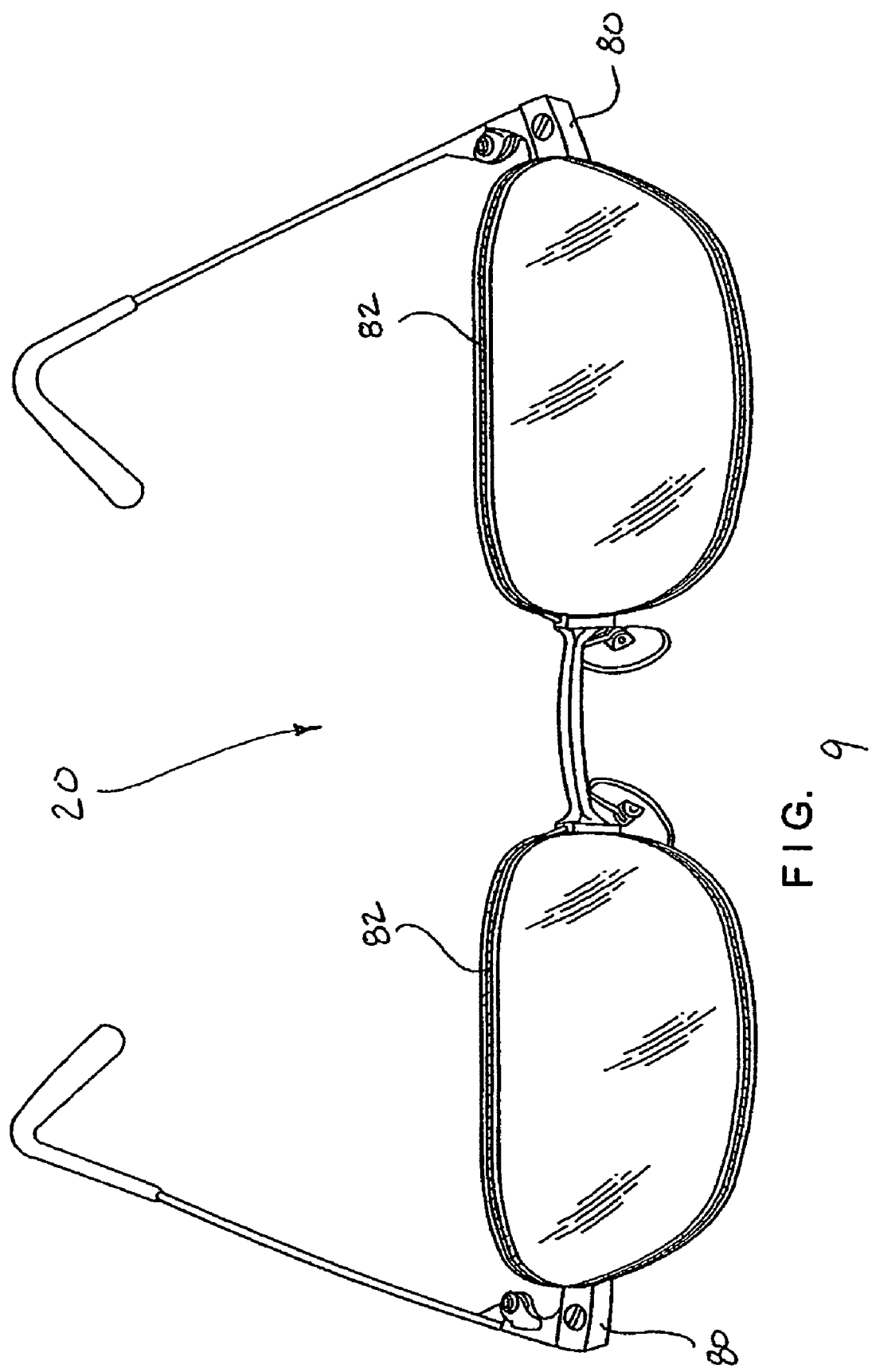

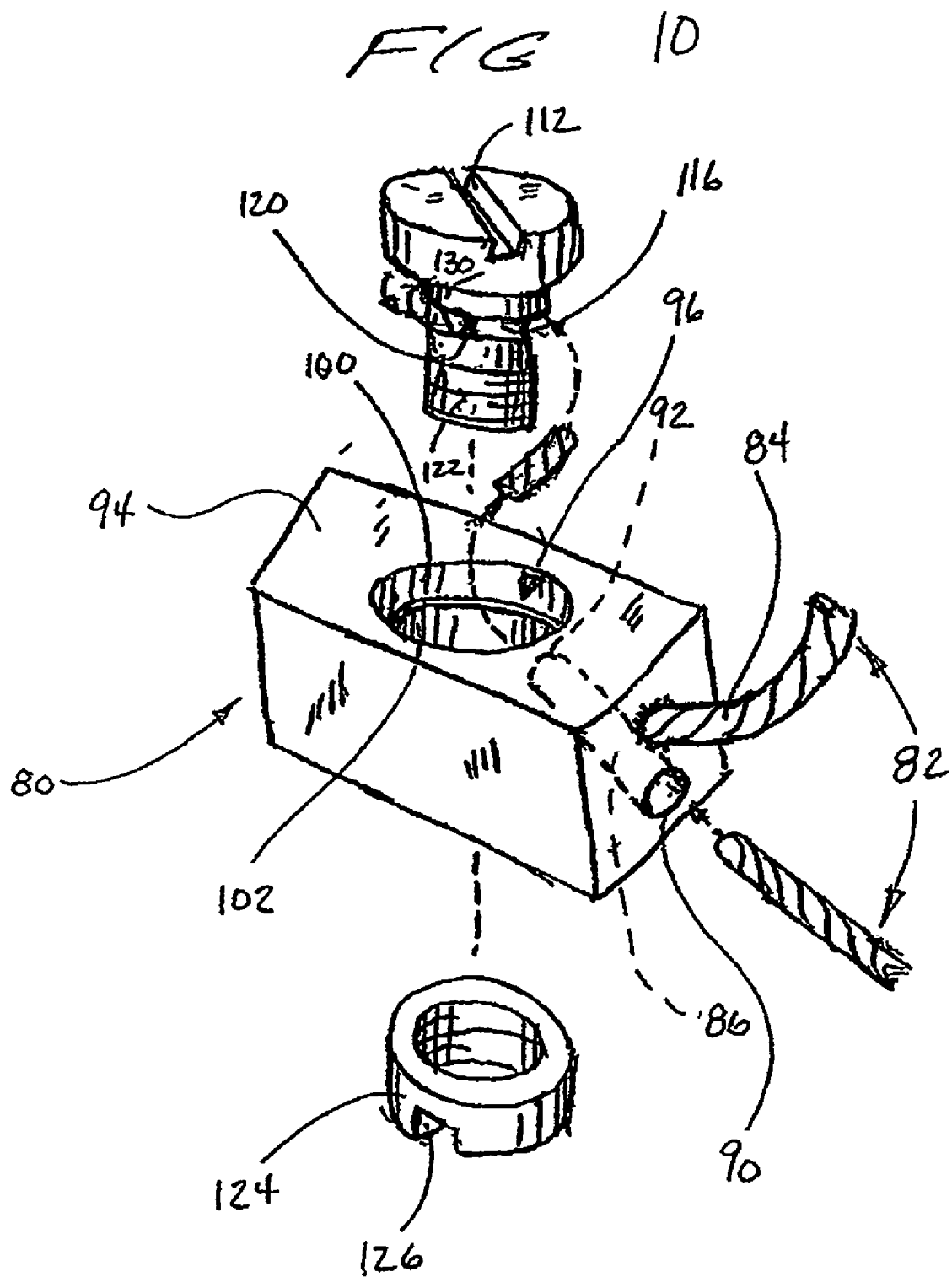

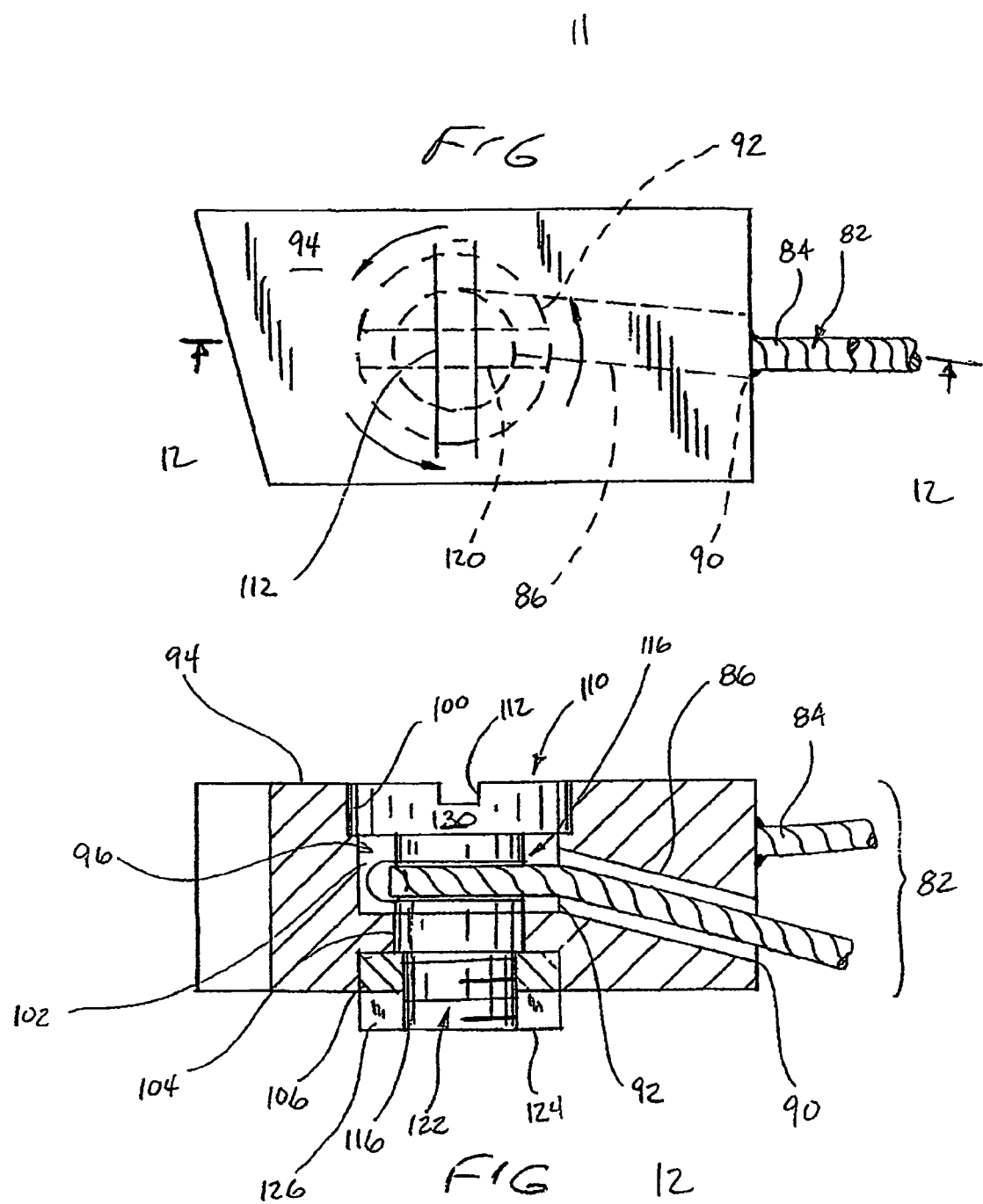

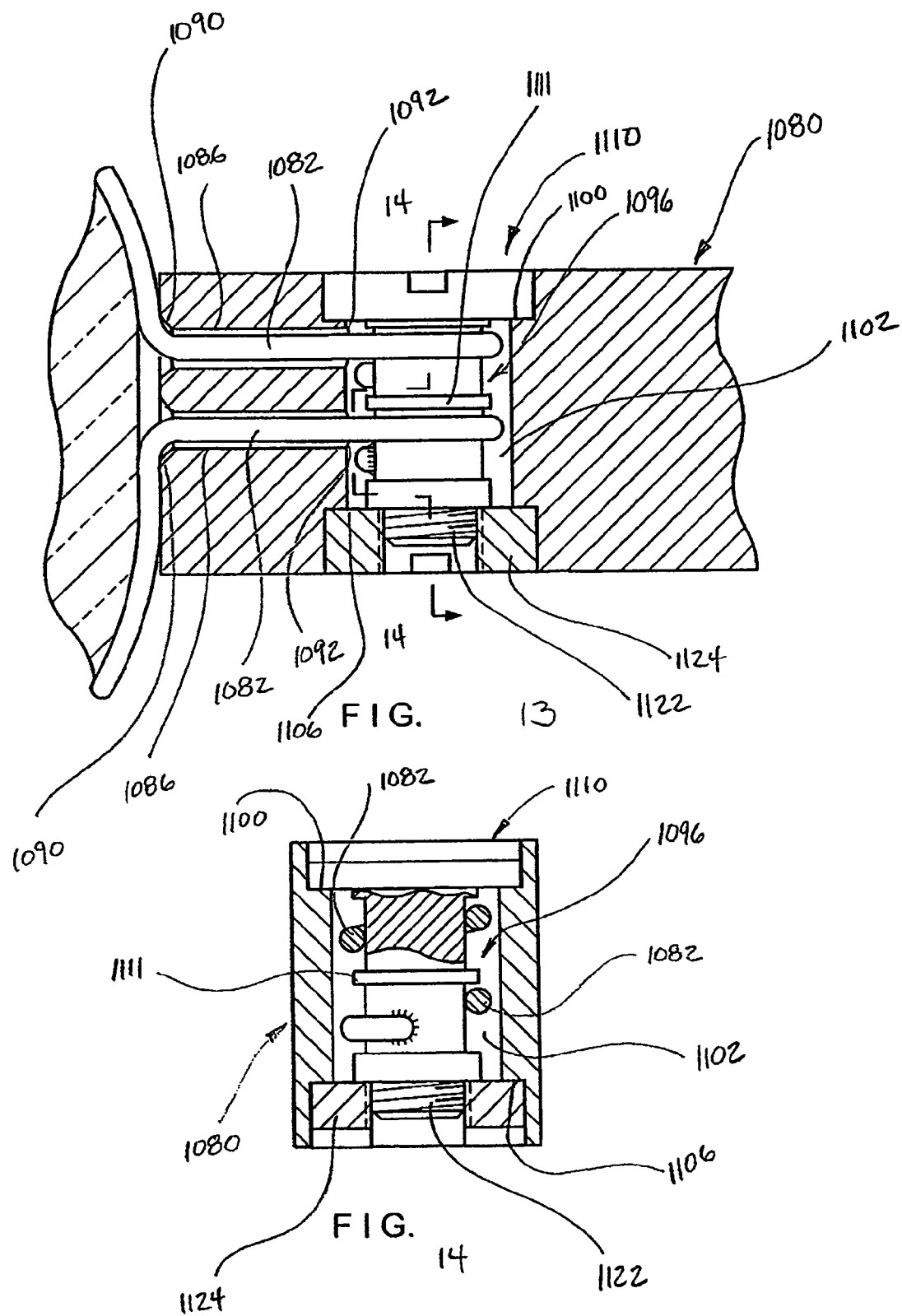

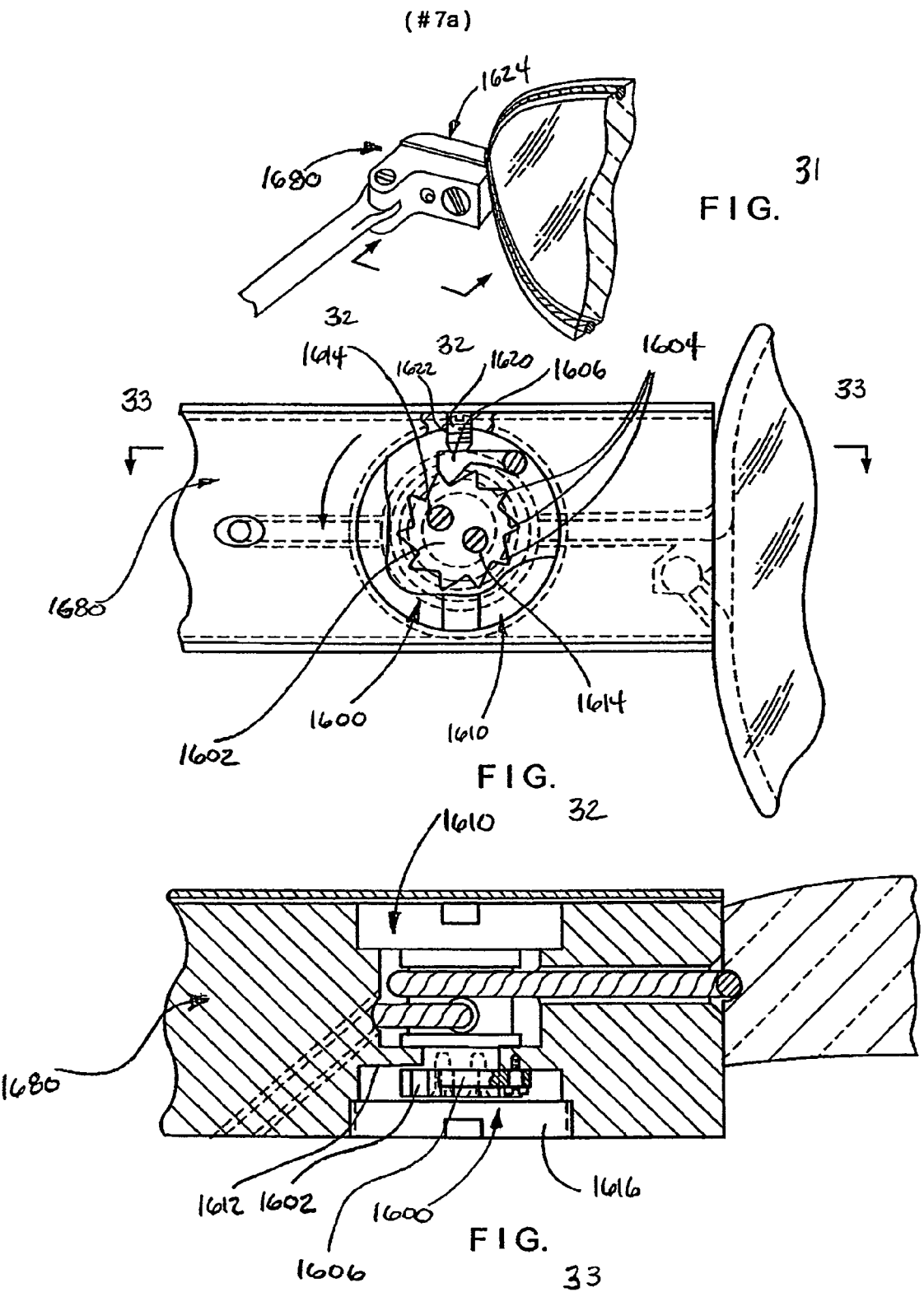

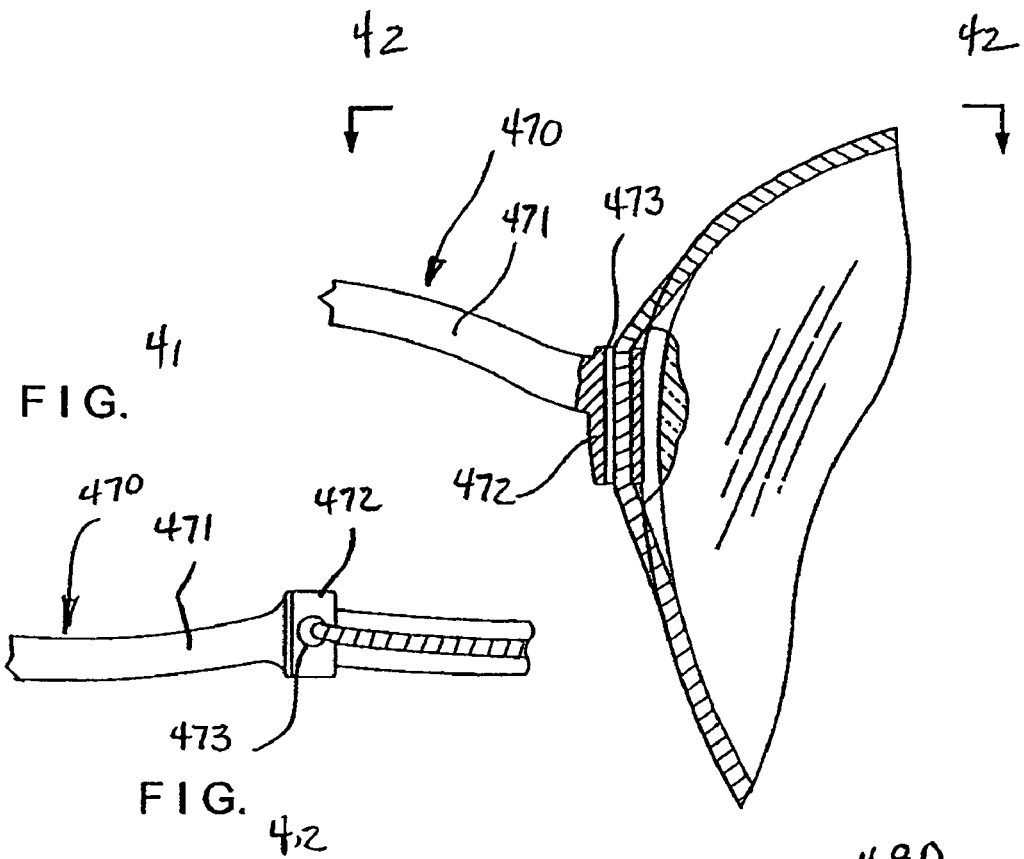
FIG. 41
FIG. 42
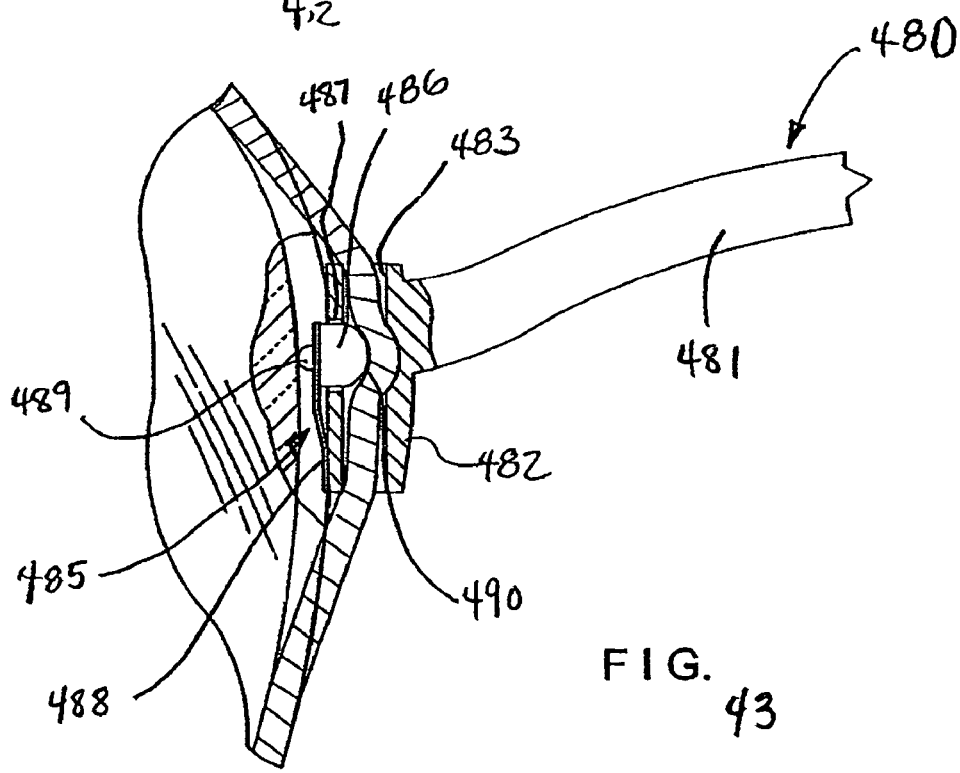
FIG. 43

ADJUSTABLE TENSIONING SYSTEM FOR RIMLESS EYEWEAR

CROSS REFERENCE TO RELATED APPLICATIONS

This application is a continuation of U.S. patent application Ser. No. 10/846,349, filed May 14, 2004, now U.S. Pat. No. 7,063,420, which is hereby incorporated by reference in its entirety.

BACKGROUND OF THE INVENTION

1. Field of the Invention

The present invention relates to an optometric device. More particularly, the present invention relates to eyewear frames designed with a rimless appearance while featuring an adjustable flexible wire that substantially encircles each lens.

2. Description of the Related Art

Eyewear styles change frequently and fashionable eyewear can be costly to purchase. In the past, eyewear style has been defined by a frame formed at least partially of metal and/or resin based materials. As such, the eyewear was heavy and the style and size of the lenses were fixed based upon the frame. To accommodate the fashion whims and optical needs of the public, hundreds of eyewear styles with differing lens sizes and shapes must currently be manufactured. To manufacture a frame for each style typically requires a large manufacturing run of each size and shape. This is costly and can result in a cost that is not recovered if the eyewear style is not popular enough to sell sufficient quantities.

Recently, so-called rimless eyewear has been introduced in which temples and a bridge are directly secured to the lenses with threaded fasteners, posts or the like, which require holes to extend through the lenses. Such rimless eyewear has been quickly adopted within the fashion world. The rimless eyewear is very light due to the lack of a heavy frame around the lenses.

However, there are several disadvantages of the truly rimless eyewear. First, the holes used to secure a bridge and a pair of temples to the lenses must be drilled very precisely. Thus, most optical technicians are not able to perform the drilling in-house and outside services must be used. Such outside services are costly and add additional time to the eyewear supply process such that end users need to wait longer for the eyewear. Further, drilling the necessary holes in the eyewear can lead to lens breakage, even by the outside services. The cost of replacement lenses obviously must be calculated into the end cost of the eyewear, which further increases the cost of eyewear. Finally, the lens materials often may not have the sufficient strength for the long term use and abuse often attributed to some eyeglass wearers. Persons working in the eyewear industry, therefore, have been trying to find a better alternative to the truly rimless eyewear currently found in the industry.

SUMMARY OF THE INVENTION

Even more recently, a rimless style of eyewear has been proposed in which the lenses are circumscribed by a thin, multiple filament wire. Examples of such eyewear are described in co-pending U.S. patent application Ser. No. 10/678,964, filed on Oct. 2, 2003, which is hereby incorporated by reference in its entirety, as well as the following applications from which that application claims priority: U.S. patent application Ser. No. 10/610,862, filed on Jun. 30, 2003, U.S. patent application Ser. No. 10/269,811, filed on Oct. 11, 2002, and U.S. Provisional Patent Application No. 60/394,837, filed on Jul. 10, 2002, each of which also are hereby incorporated by reference in their entirety.

As described in the co-pending application, the wire also passes through a portion of a bridge and a portion of an endpiece, to which a temple can be hinged. This construction, however, as described in the co-pending application, generally requires that the flexible wire to be sufficiently taut such that undesired movement of the components can be minimized or eliminated. The correct tautness or tension is achieved in many of these constructions only when the lenses are cut to the proper shape and size within very small tolerances. Due to variations in the calibration and measuring systems of individual lens cutting equipment and variations caused by optical technicians using the equipment, current rimless eyewear admits to some improvements such that secure and practical rimless eyewear can be manufactured.

While various adjustable tensioning systems for the wire can be envisioned, it is preferred that the adjustable tensioning system have an exterior configuration that closely resembles a standard endpiece. Such a construction would minimize the visual prominence of the tensioning system. Moreover, such a construction would minimize any overlap of the lens such that the prominence of the mounting structure can be reduced and the eyewear become even more transparent to observers of the user of the eyewear.

Accordingly, certain aspects of the present invention are directed to an adjustable tensioning system for rimless eyewear that comprise any of a number of embodiments of a flexible wire tensioning mechanism. Various ones of the disclosed flexible wire tensioning embodiments ensure ease of assembly as well as a system for adjusting the tension of the flexible wire that secures the lens in the rimless eyewear. One feature that makes for ease of assembly in at least some of the disclosed embodiments is that the optical technician does not have to physically handle the ends of the wire. Rather, in such embodiments, the ends of the wire are secured within the tensioning mechanism so that the optical technician need only use simple tools to loosen the assembly, insert the lenses and tighten the assembly, thereby improving the efficiency of the eyeglass assembly process.

In most preferred embodiments, the system is sized and configured to fit within a housing or to define a housing that resembles endpieces in present eyewear systems. In other words, when assembled, the housing would have a height, a width and a depth, with at least one of the width and the depth being substantially greater than the height. In other words, most present eyewear feature endpieces (e.g., where the temples attach to the lens supporting structures) that do not have a height as the longest dimension.

Since there are many well-known methods of attaching temples to a projection extending from the outside perimeter edge of a lens, it should be understood in reading any descriptions of the embodiments of the present invention that any suitable method can be used to attach the temples to the various closing mechanisms described herein.

In accordance with some embodiments of an aspect of the present invention, eyewear is provided that comprises a first lens and a second lens. A first wire substantially encircles the first lens and a second wire substantially encircles the second lens. A first end and a second end of the first wire are connected to a first insert. A first end and a second end of the second wire are connected to a second insert. A first sleeve receives at least a portion of the first insert. A second sleeve receives at least a portion of the second insert. A first threaded fastener extends through a portion of the first sleeve and engages a portion of the first insert such that tightening the first threaded fastener increases a tensile load on the first wire. A second threaded fastener extends through a portion of the second sleeve and engages a portion of the second insert such that tightening the second threaded fastener increases a tensile load on the second wire.

In accordance with some embodiments of an aspect of the present invention, eyewear is provided that comprises a first lens and a second lens. A first wire substantially encircles the first lens. A first projection is connected to a first end of the first wire. The first projection comprises a first bore and a first passage extending to the bore. A second end of the first wire extends through the first passage. A first spool is connected to the second end of the first wire and is positioned within the first bore.

In accordance with some embodiments of another aspect of the present invention, eyewear is provided that comprises a first lens and a second lens. The first lens comprises a first peripheral side surface and the second lens comprises a second peripheral side surface. A first projection extends away from the first peripheral side surface and a second projection extends away from the second peripheral side surface. A first wire end and a second wire end extend through a portion of the first projection. A third wire end and a fourth wire end extend through a portion of the second projection. A first threaded member is positioned within the first projection and is adapted to move at least a portion of at least one of the first and second wire ends in an axial direction through the portion of the first projection. A second threaded member is positioned within the second projection and is adapted to move at least a portion of one of the third and the fourth wire ends in an axial through the portion of the second projection.

In accordance with some embodiments of an aspect of the present invention, eyewear is provided that comprises a lens. The lens comprises a peripheral side surface. A projection extends away from the peripheral side surface. A first wire end and a second wire end are connected to the projection. A spool member is positioned within the first projection. At least one of the first wire end and the second wire end is connected to the spool member such that rotation of the spool member wraps a portion of the at least one of the first wire end and the second wire end about at least a portion of the spool member.

BRIEF DESCRIPTION OF THE DRAWINGS

These and other features, aspects and advantages of the present invention will now be described with reference to the drawings of several preferred embodiments. The illustrated embodiments are intended to illustrate and not to limit the invention. The drawings comprise the following figures.

FIG. 2 is an enlarged exploded perspective view of a portion of the eyewear of FIG. 1 showing a lens, a cable, an insert, a sleeve and a threaded fastener.

FIG. 3 is an enlarged sectioned view of a connection between the cable and the insert of FIG. 2.

FIG. 4 is a simplified partially broken-out top view of the portion of the eyewear of FIG. 1 shown in FIG. 2.

FIG. 5 is a sectioned view of the frame assembly of FIG. 1 generally taken along line 5-5 of FIG. 4.

FIG. 9 is a perspective view of additional eyewear that is arranged and configured in accordance with certain features, aspects and advantages of the present invention.

FIG. 10 an enlarged exploded perspective view of a portion of the eyewear of FIG. 9 showing a closing member, a threaded fastener, a cable and a threaded end cap.

FIG. 11 is a top view of the portion shown in FIG. 10 and indicating a tightening direction shown by the arrows.

FIG. 12 is a sectioned view generally taken along line 12-12 in FIG. 11.

FIG. 13 is a sectioned front view of another adjustment system that is arranged and configured in accordance with certain features, aspects and advantages of the present invention.

FIG. 14 is a sectioned view generally taken along the line 14-14 in FIG. 13.

FIG. 31 is an enlarged partial view of another adjustment system, lens and temple that are arranged and configured in accordance with certain features, aspects and advantages of the present invention.

FIG. 32 is a sectioned view generally taken along the line 32-32 in FIG. 31.

FIG. 33 is a sectioned view generally taken along the line 33-33 in FIG. 32.

FIG. 41 is an illustration of a further bridge construction for eyewear arranged and configured in accordance with some embodiments of the present invention.

FIG. 42 is a view along line 42-42 of the bridge construction shown in FIG. 41.

FIG. 43 is a sectioned view of a bridge construction for eyewear arranged and configured in accordance with some embodiments of the present invention.

DETAILED DESCRIPTION OF THE PREFERRED EMBODIMENT

Figure 1:
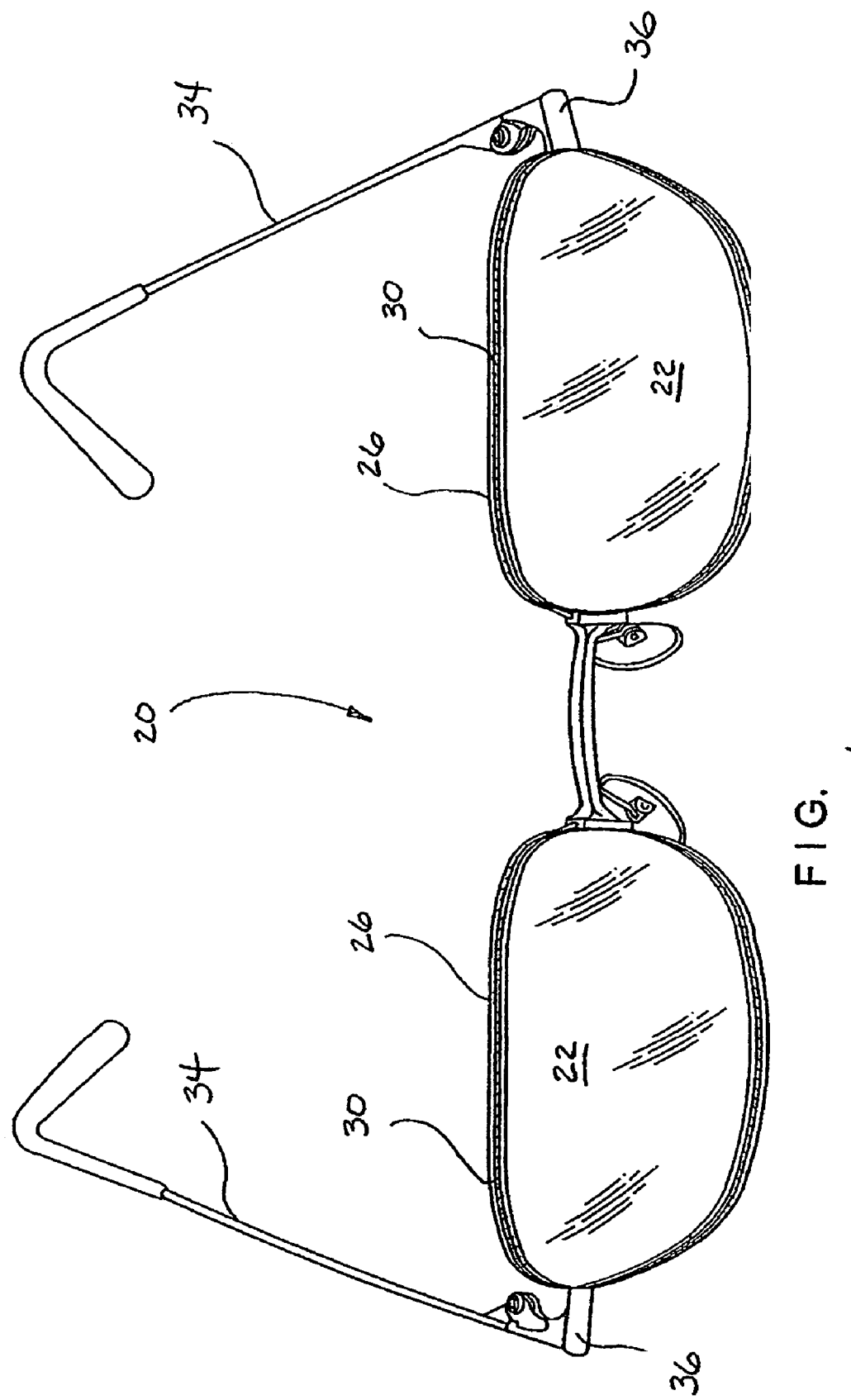
FIG. 1 is a perspective view of eyewear that is arranged and configured in accordance with certain features, aspects and advantages of the present invention.

The present invention generally relates to eyewear frame assemblies that feature a flexible cable or a wire that substantially encircles each lens such that the lens can be secured in position within a loop defined by the cable or the wire. Examples of such eyewear are shown and described in copending U.S. patent application Ser. No. 10/678,964, filed on Oct. 2, 2003, U.S. patent application Ser. No. 10/610,862, filed on Jun. 30, 2003, U.S. patent application Ser. No. 10/269,811, filed on Oct. 11, 2002, and U.S. Provisional Patent Application No. 60/394,837, filed on Jul. 10, 2002, which references are hereby incorporated by reference in their entirety. Copending U.S. patent application Ser. No. 10/846,357, filed concurrently herewith, entitled Eyeglass Frame Assembly, copending U.S. patent application Ser. No. 10/846,953, filed concurrently herewith, entitled Adjustable Tensioning System for Rimless Eyewear, also are hereby incorporated by reference in their entirety.

In some arrangements, the flexible wire generally circumscribes or encircles the associated lens. To provide a generic frame assembly that is capable of providing customizable lens shapes and sizes, the wire can have a length sufficient to extend around a lens and can be tightened about the lens such that lenses of varied sizes and shapes can be secured within a single frame assembly. In all of the embodiments described herein, each lens can comprise a tinted lens, a corrective lens or any other desired type of lens, including but not limited to, a protective lens.

Preferably, the wire extends around at least about 90% of the circumference of the associated lens. In some embodiments, the wire extends around at least about 95% of the circumference of the associated lens. In other embodiments, the wire extends almost entirely or entirely around the circumference of the associated lens. By extending the wire around substantially the entire circumference of the associated lens within a groove, a rimless look is provided to eyewear while creating a flexible and durable lens mounting system as compared to other rimless or semi-rimless eyewear (e.g., eyewear with the lens secured in an upper or lower metal frame with a nylon cord). In addition, such a construction is easy to assemble by opticians and the like without the use of costly and time consuming outside services often employed to assemble other types of fully rimless eyewear.

The wire also can comprise two or more portions that generally encircle the lens. For instance, two wire portions can each extend about halfway around a lens such that the two portions together generally encircle the lens. The wire portions can have one end suitably secured to another eyewear component, such as, for example but without limitation, a bridge, closing member or temple hinge, while the other ends of the two wires can be secured together in any manner disclosed herein. Other numbers of wires also can be used but exceeding more than two wire portions can undesirably complicate assembly of the eyewear.

In some embodiments, rigid components, such as, for example but without limitation, a bridge, a brow bar, or closing members can be positioned along the circumference of the associated lens. Preferably, these rigid components together span less than about 10% of the total circumferential length of the lens. In some embodiments, the rigid components span less than about 5% of the total circumferential length. In some preferred embodiments, the closing members have a vertical dimension that is smaller than at least one of a lateral dimension and a rearward (i.e., toward the ear) dimension. Such embodiments reduce the aesthetic presence of the closing members and thereby improve the rimless appearance of the eyewear.

Each wire desirably comprises a multiple filament construction. In other words, the wire preferably comprises more than one filament, fiber or strand. In some embodiments, the filaments are made from a metal, a metal alloy, a nylon, a polymer, a resin, a natural fiber or another naturally occurring or man-made material that is suitably strong in tension while maintaining sufficient flexibility to secure a lens in a manner described herein. In some embodiments, the wire may be manufactured of a type of fiber-optic material. While a single filament can be used and is practicable, it is currently believed that the multiple filament construction provides greater flexibility while maintaining sufficient strength for use in the manners described herein and, therefore, multiple filament constructions are preferred. Furthermore, multiple filament constructions increase the friction interface between the lenses and the wire, which friction helps secure the lens orientations relative to the other eyewear components.

The multiple filaments preferably are intertwined, braided or wrapped together to define the wire. The wire can be encased within a sheath, cover, jacket or casing, if desired. By enclosing the multiple filaments in a casing or the like, the filaments can be better protected against normal wear and tear that might otherwise occur. In one embodiment, the wire is constructed similarly to a braided fishing leader wire.

To provide a rimless appearance, the diameter of the wire should be sufficiently narrow. In some embodiments, the wire has an average diameter of between about 0.1 mm and about 3.0 mm. Preferably, the wire has an average diameter of between about 0.2 mm and about 1.6 mm, and more preferably has an average diameter of between about 0.1 mm and about 0.6 mm, and even more preferably has an average diameter of between about 0.2 mm and about 0.4 mm. In one embodiment, the wire has an average diameter of about 0.4 mm.

With reference initially to FIGS. 1 and 2, a pair of eyewear 20 is illustrated therein. The eyewear 20 advantageously is arranged and configured in accordance with certain features, aspects and advantages of the present invention. As shown, the eyewear 20 comprises two lenses 22. The lenses 22 can have any size, shape or configuration desired. In the illustrated arrangement, the lenses 22 each preferably comprise a groove, channel or the like, which groove 24 is formed in a peripheral edge 26 of each lens 22. Thus, a pair of lands is defined on either side of the groove 24.

The lenses 22 can be sized and shaped using a lens pattern (not shown) or any other suitable technique. The lenses 22 can be prepared and cut in any suitable manner and depending upon the application (e.g., tinted lenses, prescription lenses, protective lenses, etc.). Preferably, the peripheral edge 26 is generally flat, such as commonly associated with the terminology "rimless cut," which can be made on standard machinery used in the eyewear industry when that machinery is configured to make a "rimless setting." While the generally flat face is preferred along the periphery, some deviation from a generally flat face also can be practicable. Accordingly, in at least some arrangements, if the peripheral edge of the lens is curved, the corresponding edge of the adjustable tensioning mechanism which butts against the curved peripheral edge of the lens may also be made with a matching curve.

The groove 24 preferably has a depth and a width. The depth is a dimension that reflects the direction into the lens 22 toward a center of a front surface from the peripheral edge 26 (e.g., into the line of sight through the lens 24) while the width is the distance between the lands, which is generally a distance along the line of sight through the lens 24. The groove 24 preferably has a width that is as small as possible while still accommodating a wire 30, which is discussed in more detail below and in the applications and patents that have been incorporated by reference above. The depth of the groove 24 preferably is substantially the same as a diameter of the wire 30. In some arrangements, the groove 24 can be shallower than the diameter and, in other arrangements, the groove 24 can be deeper than the diameter. In one particular embodiment, the groove 24 can vary between shallower and deeper such that the wire 30 can be viewed in some regions and not in others to add a unique visual interest to the eyewear design. The wire 30 preferably is generally flush with the peripheral edge 26 of the lens 22 such that the wire 30 is substantially hidden from view.

The wire 30 preferably comprises a multiple filament construction. In other words, the wire 30, preferably, comprises more than one filament, fiber or strand, as generally indicated by reference numeral 32 (see FIG. 3). In some embodiments, the filaments 32 are made from a metal, a metal alloy, a nylon, a polymer, a resin, a natural fiber or another naturally occurring or man-made material that is suitably strong in tension while maintaining sufficient flexibility to secure a lens in a manner described herein. In some embodiments, the wire 30 may be manufactured of a type of fiber-optic material. While a single filament can be used, it is currently believed that the multiple filament construction provides greater flexibility while maintaining sufficient strength for use in the manners described herein and, therefore, multiple filament constructions are preferred.

The multiple filaments 32 preferably are intertwined, braided or wrapped together to define the wire 30. The wire 30 can be encased within a sheath, cover, jacket or casing, if desired. By enclosing the multiple filaments 32 in a casing or the like, the filaments 32 can be better protected against normal wear and tear that might otherwise occur. In one embodiment, the wire 30 is constructed similarly to a braided fishing leader wire.

The diameter of the wire 30 preferably is fairly small while large enough to suitably withstand the tensile forces applied to it during use of the eyewear. In some embodiments, the wire 30 has an average diameter of between about 0.1 mm and about 3.0 mm. Preferably, the wire 30 has an average diameter of between about 0.2 mm and about 1.6 mm, and more preferably has an average diameter of between about 0.1 mm and about 0.6 mm, and even more preferably has an average diameter of between about 0.2 mm and about 0.4 mm. In one embodiment, the wire 30 has an average diameter of about 0.4 mm.

The eyewear 20 preferably comprises two temples or ear stems 34 that are connected to the respective lenses at corresponding outward projections 36. The stems 34 can be pivotally connected to the projections 36 in any suitable manner. In some arrangements, the stems 34 are monolithically formed with the projections 36. In such arrangements, the stems 34 may not be pivotally connected to the projections 36. The stems 34 can be formed of any suitable material and can have any suitable construction.

As for overall sizing, the projections 36 preferably resemble projections found on standard eyewear frames so that the projections 36 have a minimal impact on the appearance of the eyewear. For instance, on standard eyewear frames, the projections have a height, width and depth with the width being the dimension outward from the lenses and the depth being the dimension rearward toward the ears of the wearer. These projections usually have a height that is smaller than at least one of the width and the depth. In some of the standard eyewear, the height of the projections is smaller than both the width and the depth. In the illustrated arrangement, the width is at least two times the height of the projections 36. Other sizes also are practicable.

With reference to FIG. 2, the projections 36 in the illustrated arrangement comprise a sleeve 40, an insert 42 that is received within at least a portion of the sleeve 38 and a threaded fastener 44. As stated directly above, all of the components preferably are compactly arranged to minimize the effect on the desired rimless appearance of the eyewear. Due to the desire to create a rimless appearance, special attention has been paid to arranging a compact adjustment assembly.

In the illustrated arrangement, the sleeve 40 preferably has a generally cylindrical exterior surface 46 in the illustrated arrangement. In some arrangements, however, the sleeve 40 can have other shapes, including without limitation rectangular or square, such that the visual impact can be varied, for instance. For example, a generally rectangular arrangement is discussed below with reference to FIGS. 6-8.

The sleeve 40 also comprises a passage 50. The passage 50 preferably extends axially through the sleeve 38. Preferably, the passage is generally cylindrical in appearance although other shapes can be practicable. In the illustrated arrangement, a boss 52 extends partway into the passage 50. In some arrangements, the boss 52 is an annular flange or lip. In other arrangements, inwardly extending fingers can define the boss 52. Other suitable constructions also can be used. The boss 52, while recessed within the passage 50 in the illustrated arrangement, can form an outer end of the passage 50 or sleeve 40 in some arrangements.

The insert 42 preferably is sized and configured to be received within the passage 50. More preferably, the insert 42 is closely dimensioned relative to the internal dimension of the passage 50 to achieve a rather tight but sliding fit. In some arrangements, the insert 42 and the passage 50 are shaped to, or comprise interlocking structures design to, limit rotation of the insert 42 within the passage 50. In one such arrangement, the shapes and/or the interlocking structures limit the relative orientation between the insert 42 and the passage 50 in which the insert 42 can be accepted into the passage 50. For instance, the insert can comprise a generally triangular portion and the passage can have a generally triangular shape in section.

The illustrated insert 42 comprises a main body 54 and a connecting tab 56. These two components 54, 56 can be integrally formed or can be formed separately and connected together in any suitable manner. The main body 54 in the illustrated arrangement is generally cylindrical and preferably comprises a threaded inner bore 60. As described above, the main body 54 can have other shapes in some arrangements.

The connecting tab 56 preferably is sized in proportion to the diameter of the wire 30 and the cross-section of the passage 50. In the illustrated arrangement, the tab 56 has a thickness that is slightly less than the diameter of the passage 50 less two diameters of the wire 30. Thus, the tab 56 can fit within the passage 50 together with a portion of the wire 30 that is positioned on each side of the tab 56.

The illustrated connecting tab 56 preferably comprises a pair of holes 62 that extend generally transverse to an axis of the threaded inner bore 60. The holes 62 preferably are sized to accommodate the wire 30. In one arrangement, the wire 30 can be threaded through both holes. In such arrangements, the wire 30 is closed to form a loop by a separate closing structure. In the illustrated arrangement, each end of the wire 30 is passed through a respective hole 62 and secured in position. For instance, each end of the wire can be knotted, balled, expanded, welded, brazed, soldered, or the like. In the illustrated arrangement, an end 64 of the wire 30 is deformed to a cross-section that is greater than the diameter of the hole 62.

The threaded fastener 44 preferably is a set screw or the like. It should be noted that throughout the application, any threaded fastener can be replaced by a suitable fastening arrangement, including but not limited to, snap-fit assemblies or components or press-fit components. The illustrated fastener 44 comprises a head 66 and a shank 70. The head 66 preferably can be recessed within the passage 50. In some arrangements, however, the head 66 is at least partially exposed outside of the passage. The head 66 also comprises a slot 72 that accepts a standard screw driver or the like. In some arrangements, other types of structures can be used to accept a tool for tightening the threaded fastener 44. For instance, a recessed star pattern, a recessed pair of crossing slots, a raised ridge, a pair of crossing raised ridges, a raised star or the like can be practicable.

The shank 70 preferably is at least partially threaded. The threading on the shank 70 advantageously mates with the internally threaded bore 60 of the insert 42. In some arrangements, the threaded fastener can comprise a threaded bore while the insert comprises a threaded shaft portion that mates with the threaded bore. Preferably, the shank is sized to extend through the boss 52 and into the insert 42. More preferably, the threaded bore 60 of the insert 42 has a sufficient length that the threaded fastener 44 does not bottom out within the bore 60. Rather, under extreme circumstances, tightening of the threaded fastener 44 into the insert 42 preferably can continue until the insert 42 contacts the boss 52 such that the boss 52 is pinched between the head 66 of the threaded fastener 44 and the end of the insert 42.

In use, the size and shape of the lenses 22 are selected. The lenses 22, as described above, can have any suitable size, shape and configuration. Also, the lenses 22 can be prescription, tinted, protective or the like. The lenses are then prepared and cut to the desired size and shape. Preformed lenses also can be used. Preferably, the lenses 22 are formed with the peripheral edge 26 having a flattened surface.

The groove 24 is manufactured into the peripheral edge 26 of each of the lenses 22. The groove 24 preferably is formed to a specified depth. In addition, the groove 24 preferably is formed with a specified width, which width can accommodate the wire 30. More preferably, the groove 24 is only as wide as or slightly wider than the diameter of the wire 30 and the groove 24 is as deep as or slightly deeper than the diameter of the wire 30. Thus, the wire 30 preferably would be generally flush with the peripheral edge 26 of the associated lens 22. Stated another way, the sizing of the groove 24 generally is at least partially dependent upon the diameter of the wire 30.

The eyewear 20 then is prepared for insertion of the lenses 22. In short, if the wire 30 is to be threaded through the holes 62 on the insert 42, then the wire 30 is threaded through the holes 62 and passed through a suitable closing member assembly, such as those described in the references incorporated by reference above, to form a wire loop. If the wire 30 is to be secured in a loop by the insert 42, then the wire 30 is measured to a length that will loosely secure the lens 22 in position and marked and cut. If the wire is marked, the two ends of the wire 30 can be threaded through the holes 62 and cut prior to expanding the ends of the wire or the like to secure the wire to the insert 42. Preferably, a bridge (not shown) is secured to the wire prior to the loop being formed if the loop is not closed by the bridge.

When the loops are formed, if a closing member assembly is not used, the lens 22 preferably is inserted prior to the insert 42 being secured to the wire 30. If a closing member assembly is used, preferably the insert 42 is secured to the wire 30 and then the lens 22 can be captured within the wire loop by closing the closing member assembly. Once each of the components (e.g., the lens, the bridge and the insert) is captured on or by the loop formed by the wire, then the bridge and the insert can be positioned relative to the lens in any suitable manner. Such position preferably takes into account the rotational orientation of the lens and the effect on any prescription of such a rotational orientation. It should be noted that the lenses can be inserted into a closed loop or the loop can be closed around the lens in various embodiments.

Once the lens is captured and the bridge and insert are suitably oriented, the insert 42 can be inserted into the sleeve 40 and the threaded fastener 44 can engage the insert 42. By turning the threaded fastener in a first direction, the insert is drawn into the sleeve 40, which pulls a portion of the cable 30 into the housing. Thus, turning the threaded fastener 44 can tighten the wire 30 about the lens 22. Orientation of the components can be fine tuned while the wire 30 is tightened about the lens.

In some assembly operations, the insert 42 can be secured in the sleeve 40 by the threaded fastener 44 prior to the closing of the wire loop by a closing member assembly (not shown). In such operations, the threaded fastener 44 may need to be backed out of the insert 42 either partially or completely to provide sufficient slack to allow the closing member assembly to close the wire loop about the lens 22. Alternatively or in addition, the depth of the groove 24 can be increased to allow the loop to be closed.

Once both lenses 22 are secured in the respective wire loops, the fit and orientation of the lenses 22 can be checked and adjusted, if necessary, by slightly loosening the corresponding loop (e.g., backing the threaded fastener 44 out of the insert 42). Following the desired adjustment, the loop can be tightened about the lens to maintain the adjusted orientation. Once the eyewear 20 has been assembled and the fit has been checked, the eyewear then can be cleaned and dispensed in any suitable manner.

Figure 6:
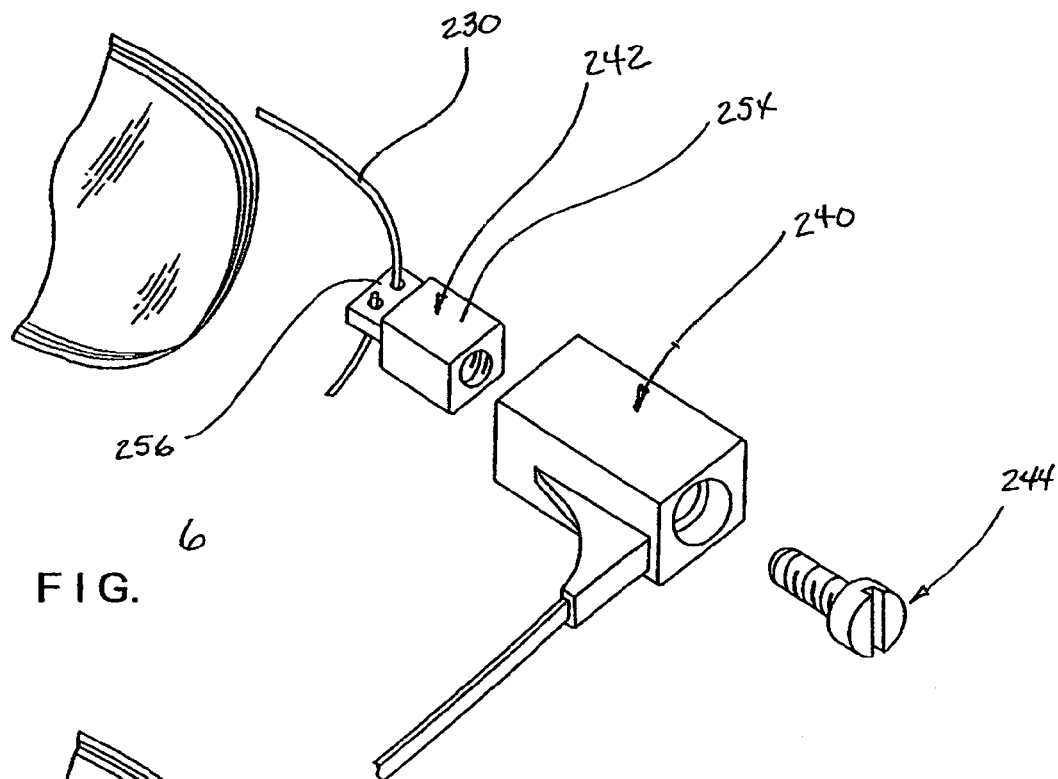
FIG. 6 is an enlarged exploded perspective view of a portion of a variation on the arrangement of FIG. 2 showing a lens, a cable, an insert, a sleeve and a threaded fastener.
Figure 7:
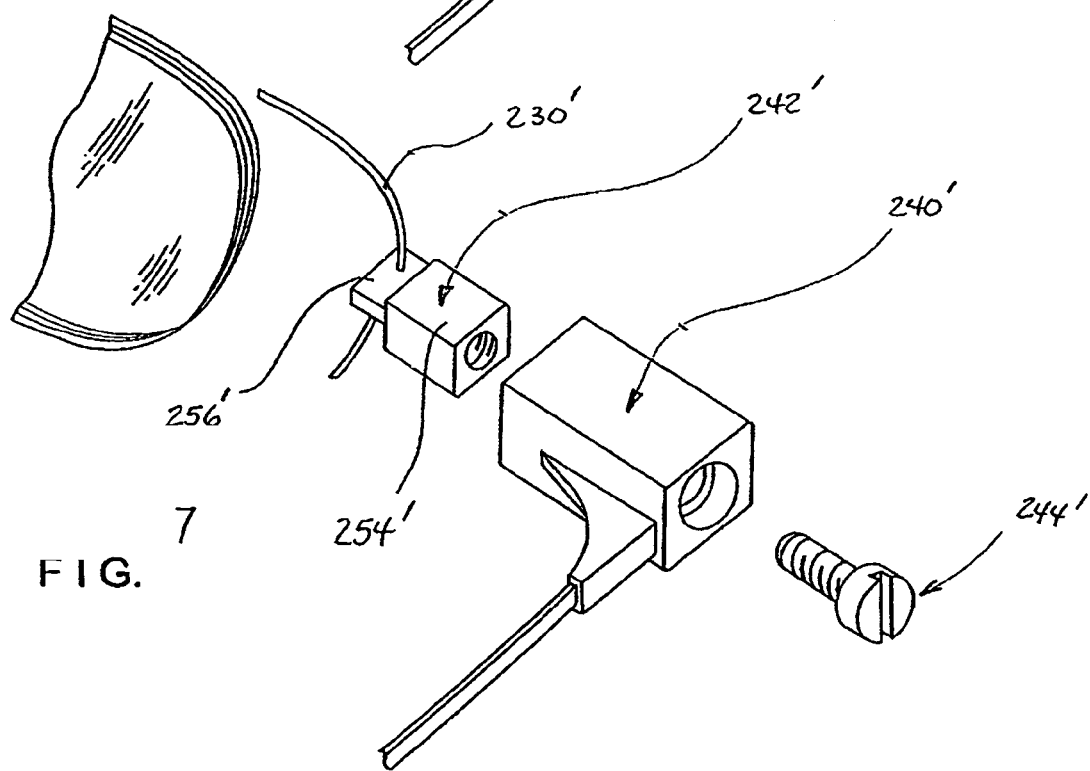
FIG. 7 is an enlarged exploded perspective view of a portion of another variation on the arrangement of FIG. 2 showing a lens, a cable, an insert, a sleeve and a threaded fastener.
Figure 8:
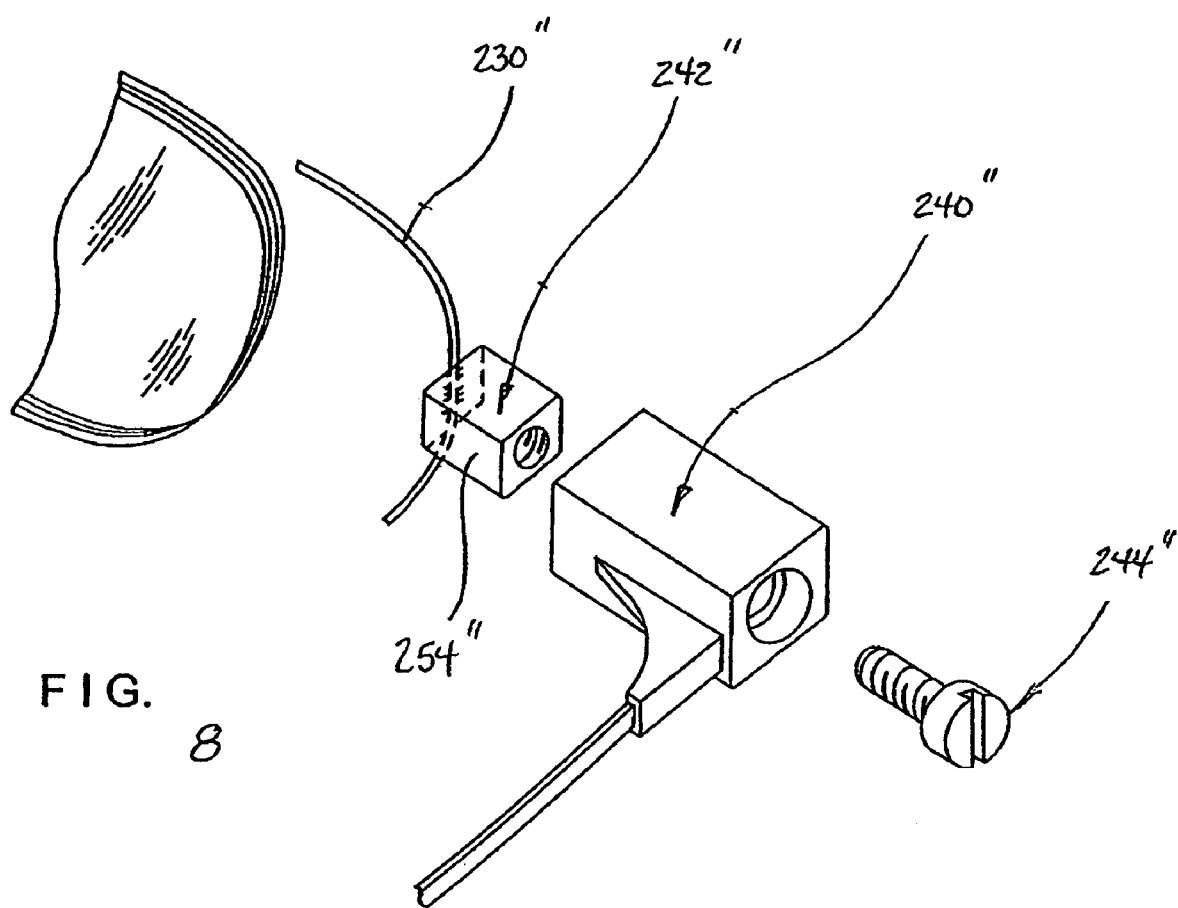
FIG. 8 is an enlarged exploded perspective view of a portion of a further variation on the arrangement of FIG. 2 showing a lens, a cable, an insert, a sleeve and a threaded fastener.

With reference now to FIGS. 6-8, a variation on the arrangement of FIG. 2 is illustrated. As described herein, this variation is similar to the arrangement of FIG. 2 but differs primary in two manners. First, the physical shape of a sleeve 240 and an insert 242 differs from the corresponding components 40, 42 described above. Second, three different techniques for attaching a wire 230 or wire portion to a connecting tab 256 of the insert 242. As such, a majority of the discussion and description set forth above is applicable to the arrangements of FIGS. 6-8.

With reference now to FIG. 6, the illustrated sleeve 240 is generally cubic in construction. In other words, the sleeve 240 would comprise generally square or generally rectangular sections taken in parallel with any of the faces of the sleeve 240. As described above, however, this construction is but one of an almost limitless array of constructions for the outer surface of the sleeve 240.

As described above, the sleeve 240 preferably comprises a passage (not shown). The passage in the arrangement of FIG. 6 preferably is generally cubic to closely correspond with the outer dimensions of the insert 242. In some arrangements, the passage can be shaped to rather loosely accommodate the insert 242. Moreover, the sleeve 240 preferably comprises a boss or an end surface to serve as a stop against movement of the insert 242 through the sleeve 240. The stop can comprise a flange or one or more individual fingers or the like, for instance.

The insert 242, as described about, preferably is sized and configured to be received within the passage of the sleeve 240. Of course, in the embodiments of FIGS. 6-8, the insert 242 advantageously is constructed to limit or prevent substantial rotation within the passage of the sleeve 240. While not readily apparent from the view show, the insert 242 preferably has a larger dimension along the top and bottom of the insert relative to the front and back such that the illustrated insert 242 is received in only two different orientations (i.e., right side up and upside down). In some embodiments, the insert can be constructed to allow more or less orientations; however, the illustrated arrangement advantageously results in the connection to the wire 230 being properly positioned.

As with the arrangement set forth above, the insert 242 comprises a main body 254 and the connecting tab 256. These components 254, 256 can be integrally formed or can be formed separately and connected together in any suitable manner. The main body 254 preferably comprises a threaded inner bore 260 and can have any suitable shape and configuration. Moreover, in some arrangements, the main body 254 can be cylindrical while the sleeve 240 is generally cubic and vice-versa. In other words, the main body 254 and the outer surface of the sleeve 240 need not be similarly shaped.

The connecting tab 256 provides a location for connection to the wire or wire portions 230. In this regard, the connecting tab 256 preferably is suitably sized and shaped. In the arrangement of FIG. 6, the connecting tab 256 comprises two holes 262 that are oriented in a side-by-side arrangement such that the centerlines are connected by a line that is generally perpendicular to an axis of rotation of a threaded fastener 244. The orientation of the holes 262 can be varied in some arrangements. Moreover, as described above, any suitable manner of securing the wire 230 within the holes 262 can be used. Furthermore, as shown in FIG. 7, the ends of the wire or wire portions 230' can be secured to the connecting tab 256' by welding, brazing, soldering, adhering, or the like. In another arrangement, which is shown in FIG. 8, the connecting tab can be eliminated such that the wire or wire portions 230" can be directly secured to the main body 254" of the insert 242". Other suitable techniques of connecting the insert 242 to the wire or wire portions 230 also can be used.

With reference now to FIGS. 9-12, a portion of another pair of eyewear 20 is illustrated therein. In particular, these figures illustrate another construction suitable for use as projections 80, which are similar to the projections 36 described above. The projections 80 can be disposed proximate the temples or proximate the bridge of the associated eyewear. In some arrangements, the illustrated projections 80 can form a portion of or be integrated into a bridge, an ear stem or a hinge structure associated with pivotally mounting an ear stem relative to the lenses of the eyewear. The projections 80 preferably, but not necessarily, are sized in the manners described above.

The illustrated projection 80 advantageously functions as a closing member assembly in that the projection can be used to close a loop of wire 82. The wire can be constructed in any manner set forth herein. In the arrangement illustrated in FIG. 10, a first end 84 of the wire is secured to a portion of the projection 80 in any suitable manner. In one arrangement, the first end 84 of the wire 82 is welded, brazed or soldered to the projection 80. In other arrangements, the first end 84 of the wire 82 and the projection 80 can be adhered, cohered, mechanically connected with interlocking structures or the like. Furthermore, in some arrangements, more than one wire 82 can be attached to the projection 80.

The projection 80 contains a wire passage 86. It should be noted that, unless otherwise specified or apparent, diameters of any passages, bores, or other channels or formations that accept the wire preferably are sufficiently greater than the diameter of the associated wire to facilitate movement of the movement therein. The wire passage 86 is defined within the projection and extends between a first opening 90 and a second opening 92. Preferably, the first opening is positioned generally in line with the attachment location between the first end 84 and the projection 80 when viewed from the top down. This placement helps the projection 80 resist twisting movement when the wire 82 is tightened about a lens. The wire passage 86 also extends upward from the first opening 90 to the second opening 92 at an angle relative to an upper surface 94 of the projection 80. The angled orientation of the passage allows the second opening to be centrally positioned within the height of the projection.

The second opening 92 opens into a hole 96 formed within the projection 80. The illustrated hole 96 comprises four distinct portions: a large counter bore portion 100, a medium winding chamber portion 102, a support portion 104 and a medium counter bore portion 106. Other hole configurations can be used, however.

A spool member 110 generally is received within the hole 96. The spool member 110 preferably comprises a tool engaging structure 112 at one end. While the illustrated tool engaging structure 112 comprises a slot, other suitable structures also can be used, including but not limited to a square or hexagonal shaped recess. For instance, any of the structures described above with respect to the threaded fastener 44 also can be used.

A central region 114 of the spool member 110 comprises a generally circumferential groove 116 and another hole 120. The groove 116 preferably is substantially in line with the second opening 92. In addition, the groove 116 preferably is radially spaced from the wall of the winding chamber portion 102 of the hole 96. The spacing allows the wire 82 to wrap at least partially around the spool member 110. The hole 120, shown best in FIG. 10, preferably intersects the groove 116. The hole is sized to accommodate a portion of the wire 82. By placing a portion of the wire 82 in the hole 120, the wire 82 will wrap about the spool member 110 as the spool member 110 is turned relative to the projection 80.

A lower region 122 of the spool member 110 preferably is threaded. This threaded portion 122 engages with threads in a sleeve 124. In a tightened configuration, the sleeve 124 abuts upon the support portion, which locks the spool in position. Accordingly, it is desirable that the sleeve 124 can turn relative to the projection 80. More preferably, at least a portion of the sleeve 124 can be recessed inside the hole 96 even while the sleeve 124 can turn relative to the projection 80.

One end of the sleeve also preferably comprises a tool engaging structure 126. As shown in FIG. 10, the tool engaging structure 126 is a slot in the illustrated arrangement; however, any other suitable tool engaging structure, including those identified above, also can be used. Thus, the sleeve 124 can be torqued into position against the support portion 104 of the hole 96. When the sleeve 124 is torqued into position, the upper portion or head 130 of the spool member 110 is drawn down into abutment with the step defined at the transition from the counter bore portion 100 and the winding bore portion 102 of the hole 96. Thus, the spool member 110 would be frictionally locked in position.

In use, the lenses are prepared as described above. The eyewear 20 also is prepared for insertion of the lenses. In short, the wire 82 is threaded through the passage 86 and inserted into the hole 120 prior to the spool 110 being inserted into the hole 96. In the illustrated arrangements, these steps are performed prior to the lens being inserted into the loop; however, in some arrangements, the loops will be closed by separate closing members and the wire 82 can be connected to the spool 110 with the separate closing members being used to either form the loop prior to insertion of the lens or form the loop directly around a lens. Preferably, a bridge (not shown) also is secured to the wire 82 prior to the loop being formed.

Once each of the components (e.g., the lens, the bridge and the insert) are captured on or by the loop formed by the wire, then the bridge and the projection 80 can be positioned relative to the lens in any suitable manner. Such position preferably takes into account the rotational orientation of the lens and the effect on any prescription of such a rotational orientation. It should be noted that the lenses can be inserted into a closed loop or the loop can be closed around the lens in various embodiments.

Once the lens is captured and the bridge and projection are suitably oriented, the spool 110 can be turned to tighten the wire about the lens. By turning the spool 110 in a first direction, a portion of the cable 82 is wound onto the spool. Once the proper tension is achieved, the spool 110 is locked in position by tightening the sleeve 124.

Once both lenses are secured in the respective wire loops, the fit and orientation of the lenses can be checked and adjusted, if necessary, by slightly loosening the sleeve 124 and reducing the tensile forces by turning the spool 110 slightly. Following the desired adjustments, the loop can be tightened about the lens to maintain the adjusted orientation. Once the eyewear has been assembled and the fit has been checked, the eyewear then can be cleaned and dispensed in any suitable manner.

With reference now to FIGS. 13 and 14, a variation on the arrangement of FIGS. 10-12 is illustrated. In the variation shown in FIGS. 13 and 14, a spool member 1110 is adapted to wind two ends of a wire 1082 at the same time. While the illustrated arrangement shows two ends of the same wire being wound onto and/or off of the spool member 1110, the spool member 1110 can receive two wire ends that are each associated with a separate wire or wire portion. The wire ends can be secured to the spool member 1110 in any suitable manner, including but not limited to welding, brazing, soldering, adhering or mechanically interlocking structures.

As illustrated, a projection 1080 functions generally as a closing member assembly in that the projection 1080 can be used to close a loop of wire 1082. The projection 1080 comprises two wire passages 1086 that each extends between a first opening 1090 and a second opening 1092. The openings 1090, 1092 can comprise chamfered or countersunk features to reduce the likelihood that the wire 1082 will be cut by the edge of the openings 1090, 1092, especially at the first openings 1090. The openings also preferably are generally vertically aligned with each other and with a groove formed within the peripheral edge of the lens being mounted. In some arrangements, the passages 1086 can angle toward each other from outside to inside (e.g., spaced wider at the first openings 1090 than at the second openings 1092).

The second openings 1092 open into a hole 1096 formed in the projection 1080. In this arrangement, the hole 1096 comprises three distinct portions: a large counter bore portion 1100, a winding chamber portion 1102 and a medium counter bore portion 1106. In some arrangements, however, a support portion can be present, as described above. Moreover, other hole configurations can be used.

The spool member 1110 generally is received within the hole 96. The spool member 1110 can be constructed generally as described above. One difference in the construction is a centrally positioned flange 1111 that generally separates the first wire end from the second wire end. Another difference is that the illustrated spool member 1110 is designed for the wire ends to be secured without being inserted into a hole in the spool member 1110. In some arrangements a hole can be provided; however, not having to thread the wire ends into the hole eases assembly.

As described above, a lower region 1122 of the spool member 1110 preferably is threaded. The threaded lower region 1122 engages with threads in a sleeve 1124. In this arrangement, however, the sleeve 1124 can be tightened against the base of the medium counterbore portion 1106, which locks the spool member 1110 in its rotational orientation. Such a construction is discussed above. Moreover, additional features of the sleeve 1124 can be as described above.

With reference now to FIGS. 15-22, an arrangement 1200 is illustrated that is largely similar to the arrangements of FIGS. 9-14. The arrangement 1200 generally features a spool member 1210 that is adapted to rotate about a generally vertical axis. The spool member is positioned within suitable projections 1280 that extend generally laterally outward from each lens 1218. The projections 1280 generally function as closing members in that the projections 1280 can be used to close a loop of wire 1282, which is arranged and configured in any of the manners set forth herein. In addition, as discussed elsewhere, the wire 1582 can be formed in a single piece or can comprise more than one wire portion that is suitably secured together (e.g., soldered to a bridge, as discussed elsewhere herein).

Figures 15, 16, 17:
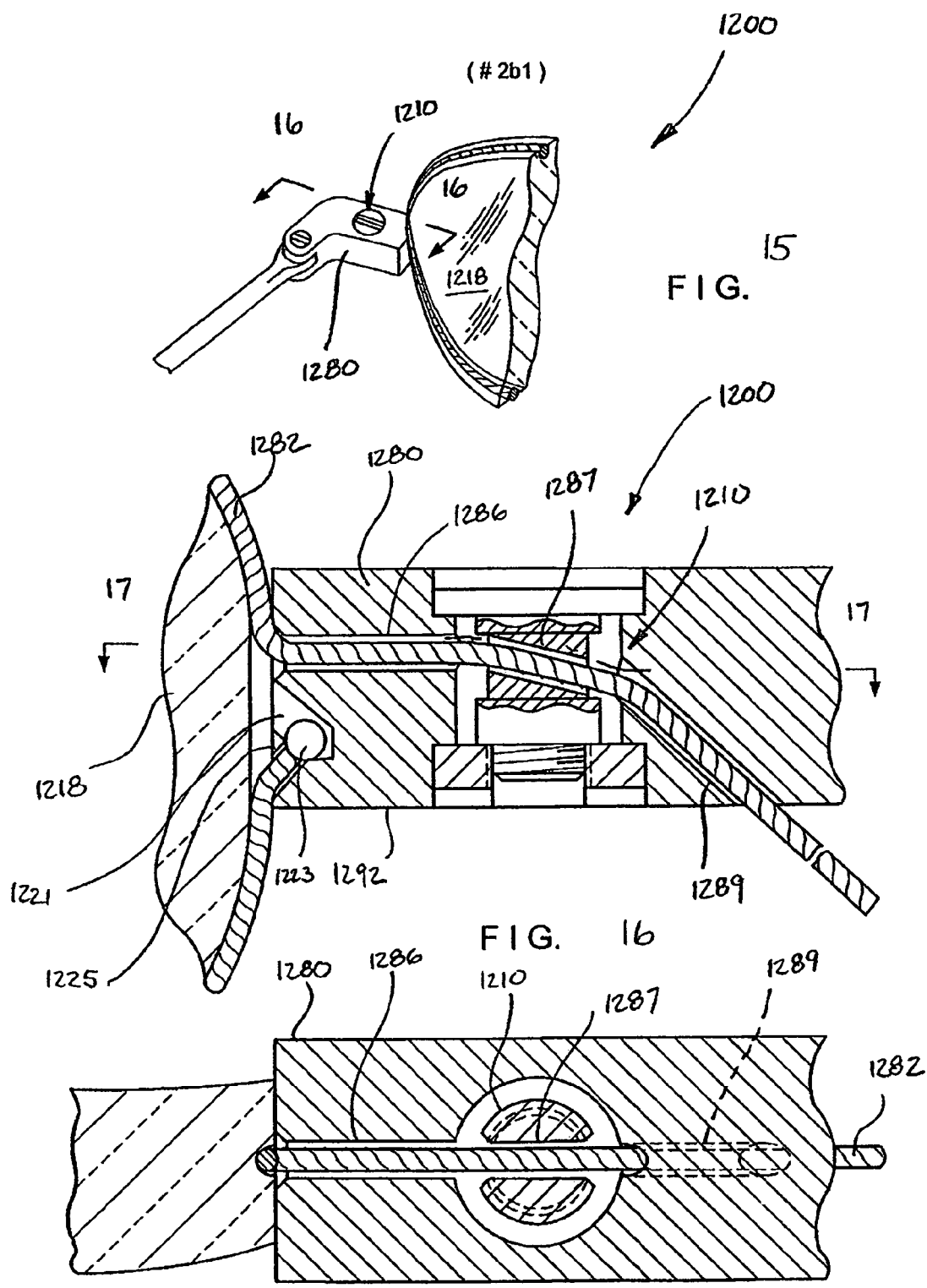
FIG. 15 is an enlarged partial view of an adjustment system, lens and temple that are arranged and configured in accordance with certain features, aspects and advantages of the present invention.
FIG. 16 is a sectioned view generally taken along the line 16-16 in FIG. 15.
FIG. 17 is a front view of the adjustment system of FIG. 15 that is taken along the line 17-17 in FIG. 16.
Figure 18:
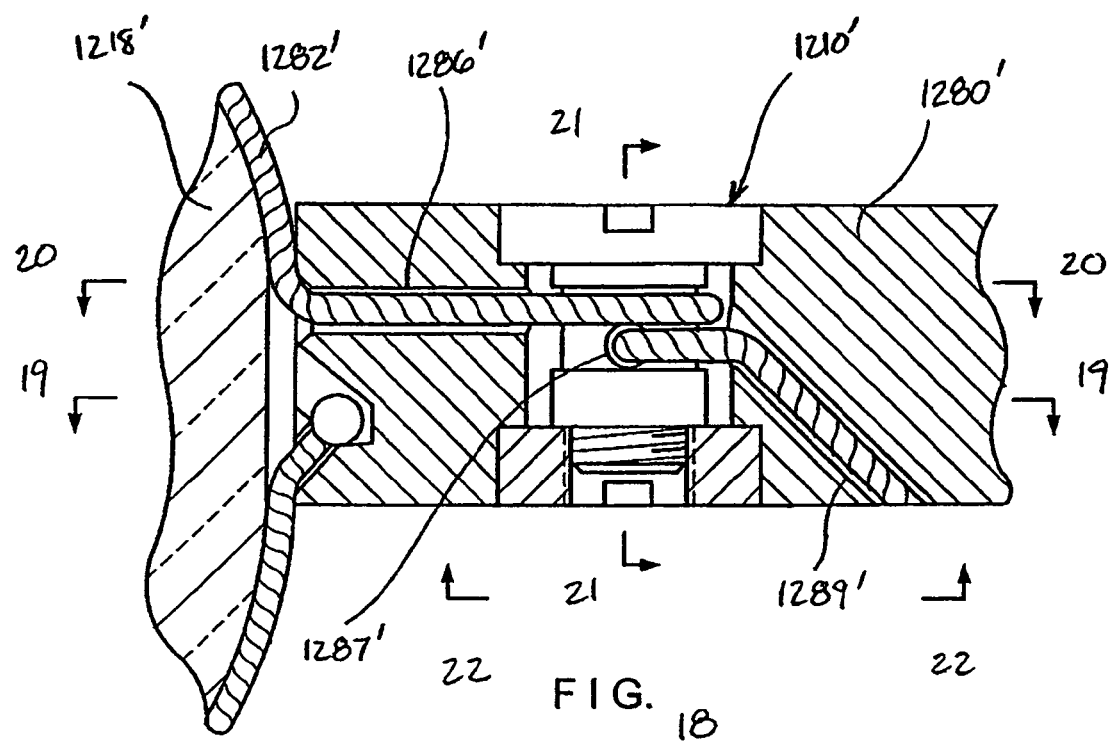
FIG. 18 is a sectioned view of the adjustment system similar to FIG. 16 with the wire wrapped about the spool member.
Figure 19:
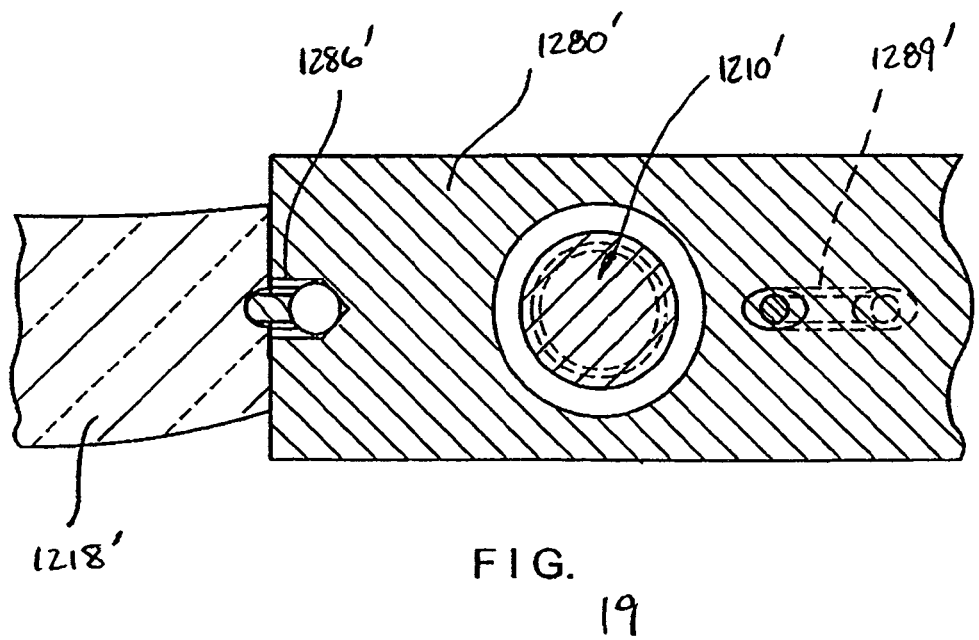
FIG. 19 is a sectioned view generally taken along the line 19-19 in FIG. 18.
Figure 20:
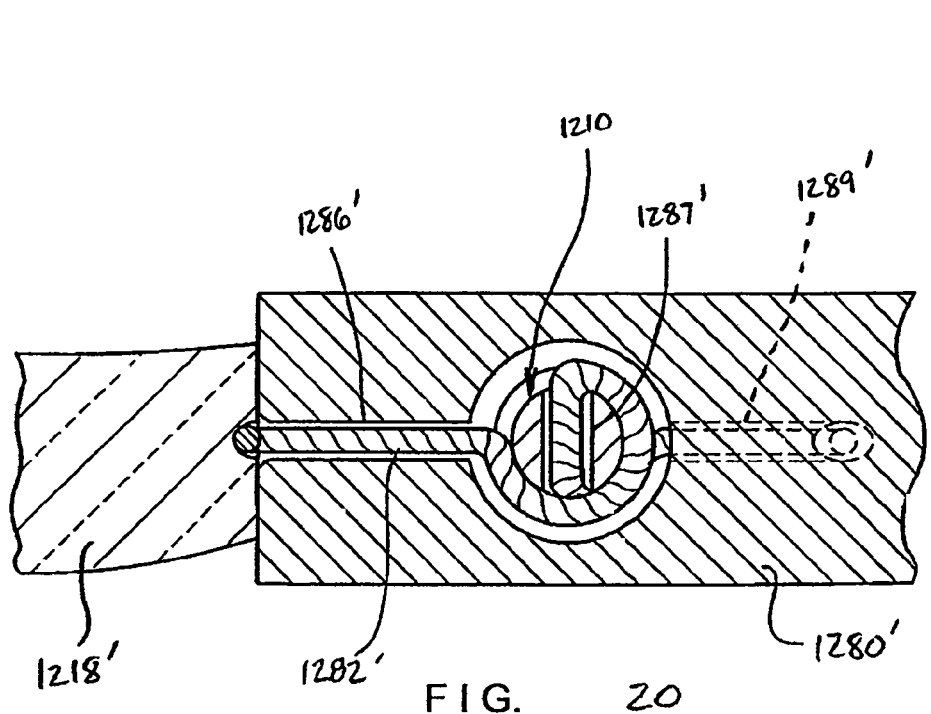
FIG. 20 is a sectioned view generally taken along the line 20-20 in FIG. 18.
Figure 21:
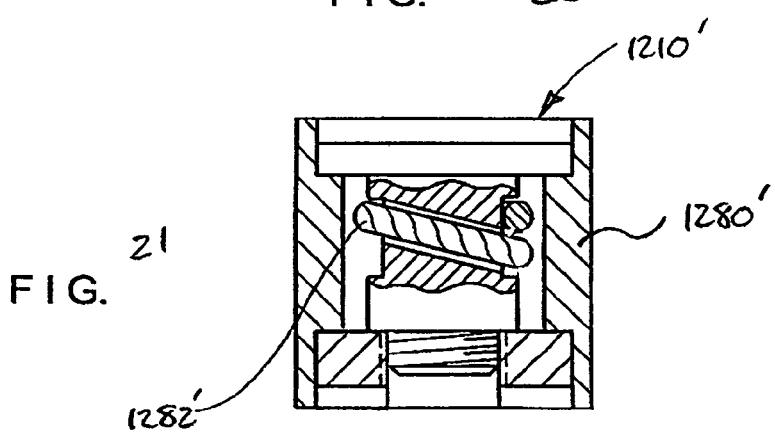
FIG. 21 is a sectioned view generally taken along the line 21-21 in FIG. 18.
Figure 22:
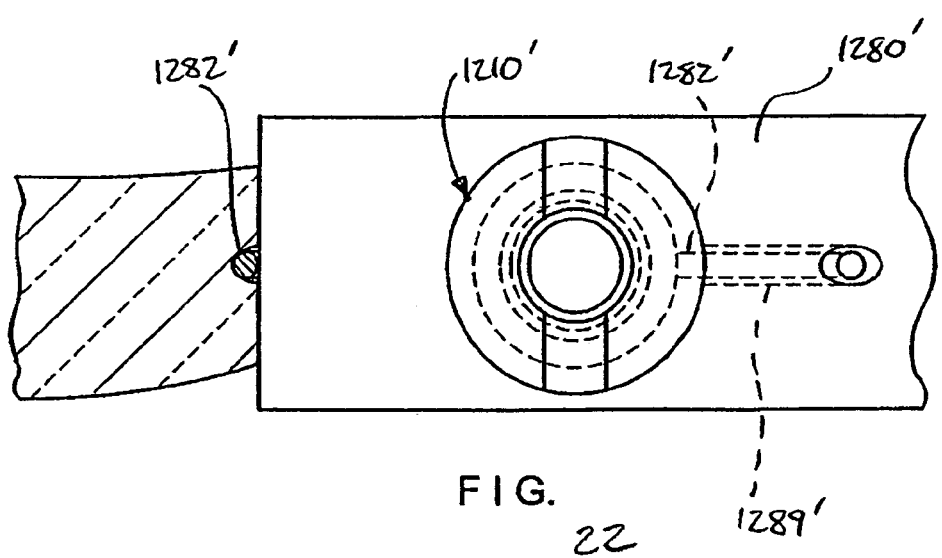
FIG. 22 is a sectioned view generally taken along the line 22-22 in FIG. 18.

The projection 1280 comprises a first wire passage 1286 (see FIGS. 16 and 17). In the arrangement of FIG. 16, the first wire passage 1286 preferably is centrally positioned with respect to a depth of the projection 1280. As shown, the first wire passage 1286 preferably is positioned to extend through the axis about which the spool member 1210 can be rotated. The central position helps direct the wire 1282 through an opening 1287 formed through the spool member 1210. The opening 1287 preferably is aligned with a slot 1312 formed in the spool member 1210 such that the rotational positioning of the opening 1287 can be visualized based upon the orientation of the slot 1312. Other suitable alignment features also can be used.

The first wire passage 1286 also is shown extending in a generally horizontal manner. In some arrangements, the first wire passage 1286 can slope downward toward the spool member 1210. Preferably, however, the first wire passage 1286 is generally aligned with the opening 1287 in the spool member 1210. The first wire passage 1286 accommodates the wire 1286, which passes through the illustrated spool member 1210. As a result of the routing of the wire 1282 through the projection 1280, the wire wraps around the spool member 1210 when the spool member 1210 is rotated.

With reference to FIGS. 16 and 17, the hole 1287 through the spool member 1210 can be sloped through the spool member 1210 such that the wire 1286 can be aligned with the first wire passage 1286 and with a second wire passage 1289. The second wire passage 1289 preferably extends through a bottom surface 1292 of the projection 1280. In this manner, the wire 1286 can be pulled through the projection 1280 before the wire 1286 is tightened and secured by the spool member 1210. It should be noted that the wire 1286 can be knotted, crimped, expanded or the like or can receive a ball of solder prior to movement of the spool member 1210. Such arrangements can reduced the likelihood that the end of the wire will be pulled back into the projection 1280 when the spool member 1210 is rotated, which increases the likelihood that rotation of the spool member 1210 will increase the tension or decrease the length around the loop. It will be appreciated that rotation of the spool member will adjust the tension or length of the loop and, once a desired tension or length has been achieved, the spool member 1210 can be locked in a rotational orientation in the manners described above.

The illustrated projection 1280 also comprises a socket 1221 that receives an end of the wire 1286. This end of the wire 1286 advantageously carries an anchor member 1223. A third passage 1225 extends away from the socket 1221. The third passage 1225 preferably extends at an angle such that the wire 1286 can have a generally smooth transition to the lens perimeter.

As used herein, an anchor is a generally enlarged portion attached to or integrally formed with the wire. The anchor member 1223 shown in FIG. 16 is generally spherical. The anchor member 1223 can be cubic, rectangular, or the like and can have any suitable configuration, including but not limited to conical and oval. While the illustrated anchor member 1223 does not necessarily complement the shape of the socket 1221, in some arrangements, the anchor member 1223 can be sized and configured to complement the socket 1221. Moreover, instead of the end of the wire being fixed to the anchoring member 1223, the end of the wire simply can be tied in a knot form, receive a ball of solder, or be expanded in order to lock the end of the wire in a suitably shaped recess formed in the projection 1280. Desirably, the anchor member and the wire (or the knot and the wire) together define a type of stopper knot locking assembly. Once the wire is secured in the projection, any excess wire can be cut or otherwise removed from the frame assembly.

While this embodiment has been described with reference to a construction in which the wire passes through an opening in the spool member, the wire can be attached to the spool member in any suitable manner. For instance, the wire can pass through an opening and be soldered, welded, crimped, mechanically secured, adhered or the like, to the spool member. In some arrangements, the wire may not pass through any portion of the spool member. In other arrangements, a mechanically interlocking structure can be used.

Figure 23:
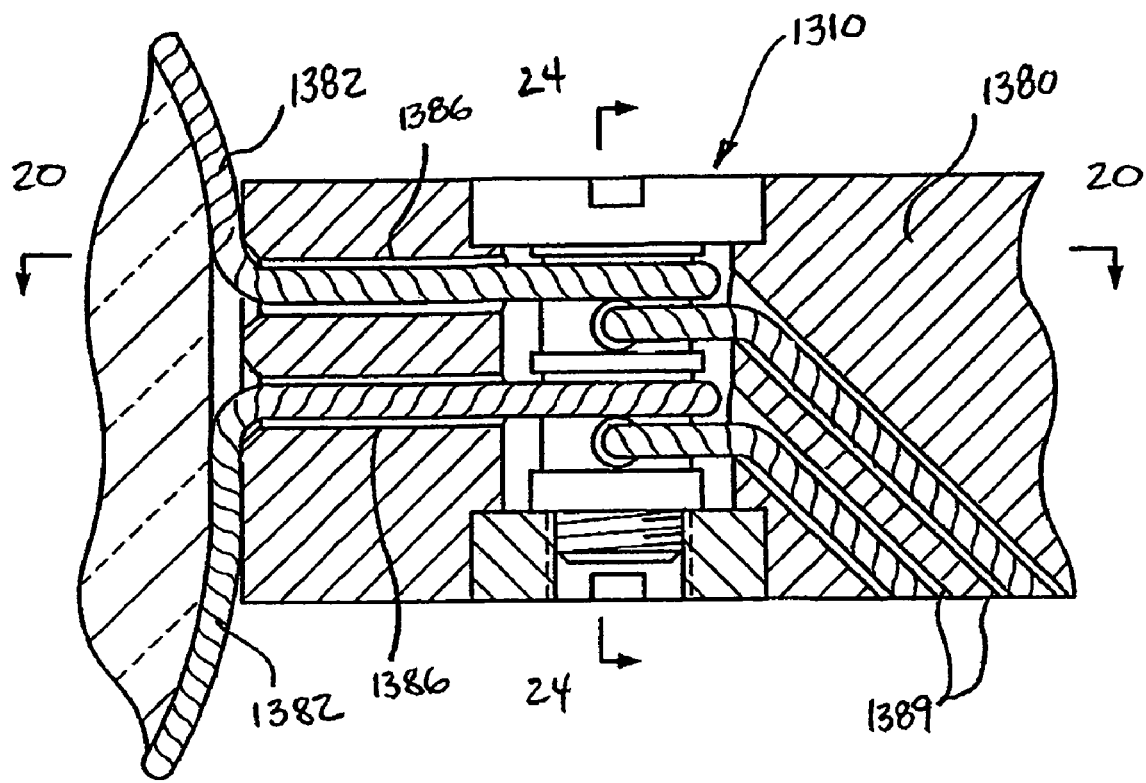
FIG. 23 is a sectioned view of another adjustment system, lens and temple that are arranged and configured in accordance with certain features, aspects and advantages of the present invention. The sectioned view is similar to the sectioned view of FIG. 18 and reflects a section through eyewear that is generally parallel to a front view of the associated eyewear.
Figure 24:
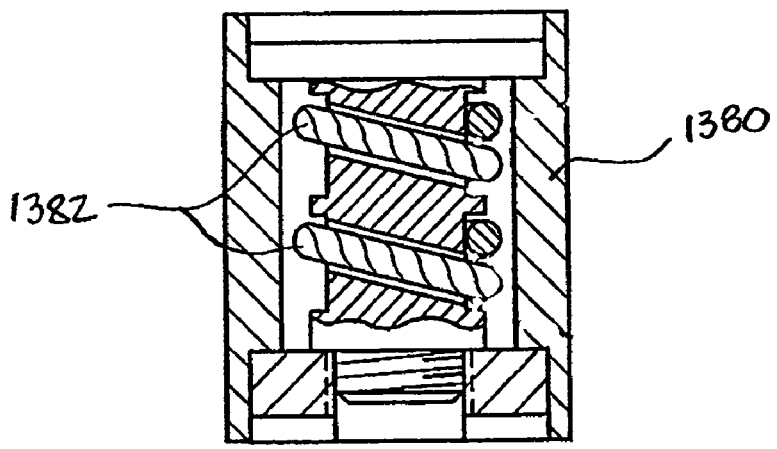
FIG. 24 is a sectioned view generally taken along the line 24-24 in FIG. 23.

With reference now to FIGS. 23 and 24, a spool member 1310 is shown with a pair of wires 1382 connected thereto. The spool member is adapted to secure two wire ends. While, in some arrangements, a locking sleeve similar to the sleeve 1124 described above can be used, in other arrangements, friction forces generated as the wire is wound onto the spool member can act to limit substantial rotational movement of the spool member. In other words, in some arrangements, the wire may be wedged between the spool member and a wall of the projection.

The spool member 1310 is positioned within a projection 1380. The projection 1380 comprises a pair of first wire passages 1386 and a pair of second wire passages 1389. The wires 1382 extend through the respective first wire passage 1386, around and through the respective spool member 1310 and through the respective second wire passage 1389. Rotational of the spool member 1310, therefore, can be used to adjust the length of the wire loop or the tension by movement of both wire ends. Thus, rotation of the spool member generally doubles the effect relative to the arrangements in which only a single wire end is secured to a spool.

As described herein and in the discussions above, spool members generally can be used to secure one or two wire ends and can be oriented about either a generally vertical or a generally horizontal rotational axis, as will be described in greater detail below. The arrangement of FIGS. 23 and 24 generally is configured in a manner similar to that discussed directly above in which a single wire end 1282' was secured and the spool member 1210' comprised a generally vertical axis of rotation. Thus, further description is deemed unnecessary and duplicative. It should be noted, however, that this arrangement allows both ends of the wire 1382 to be secured to the spool. More preferably, this arrangement can be used in arrangements having a pair of wire portions extending from another portion of the frame assembly, such as a bridge, for instance. Thus, rotation of the spool member 1310 of FIGS. 23 and 24 would result in twice the wire movement relative to rotation of the spool member 1210' of FIGS. 18-22.

With reference now to FIGS. 25-29, an arrangement is illustrated having similarities to the arrangements of FIGS. 10-12 and FIGS. 13 and 14. The arrangement differs largely in the orientation of a spool member 1510. In the arrangements of FIGS. 9-17, the spool members have a generally vertical axis of rotation while, in the arrangement of FIGS. 25-29, the spool member 1510 has a generally horizontal axis of rotation. Moreover, the axis of rotation of the spool member 1510 preferably extends in a front and back direction of the eyewear (e.g., generally in the direction of sight when looking through the lenses in a straight forward manner).

Figures 25, 26, 27, 30:
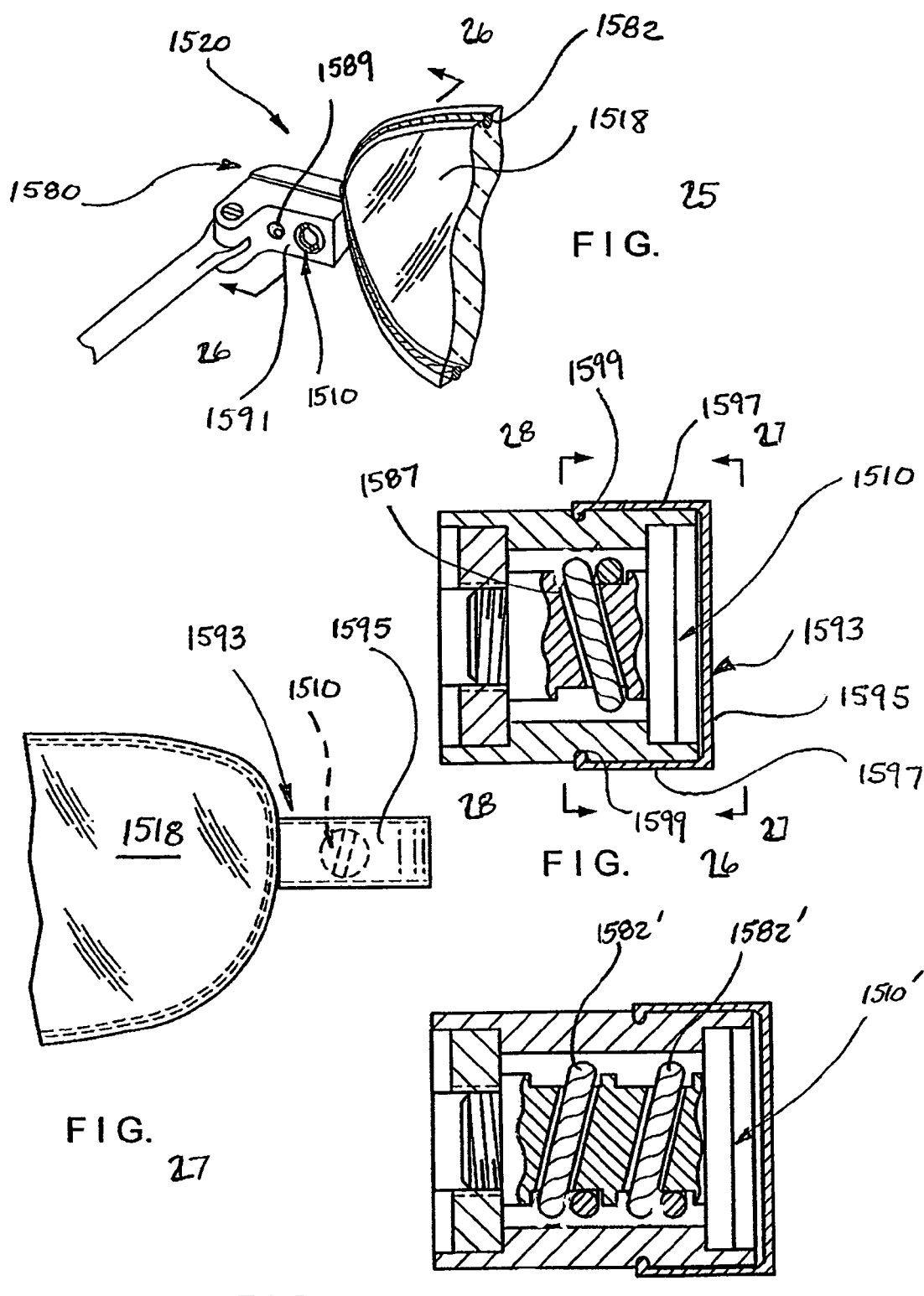
FIG. 25 is an enlarged partial view of an adjustment system, lens and temple that are arranged and configured in accordance with certain features, aspects and advantages of the present invention.
FIG. 26 is a sectioned view generally taken along the line 26-26 in FIG. 25.
FIG. 27 is a front view of the adjustment system of FIG. 25 that is taken along the line 27-27 in FIG. 26.
FIG. 30 is a view similar to FIG. 26 with two wire ends being secured to a spool.

With reference to FIG. 25, a portion of a pair of eyewear 1520 is illustrated therein. The eyewear comprises projections 1580 that extend generally laterally outward from each lens 1518. The projections can have any suitable construction and sizing, including those discussed elsewhere herein. The projections 1580 generally function as closing members in that the projections 1580 can be used to close a loop of wire 1582, which is arranged and configured in any of the manners set forth herein. In addition, as discussed elsewhere, the wire 1582 can be formed in a single piece or can comprise more than one wire portion that is suitably secured together (e.g., soldered to a bridge, as discussed elsewhere herein).

Figure 28:
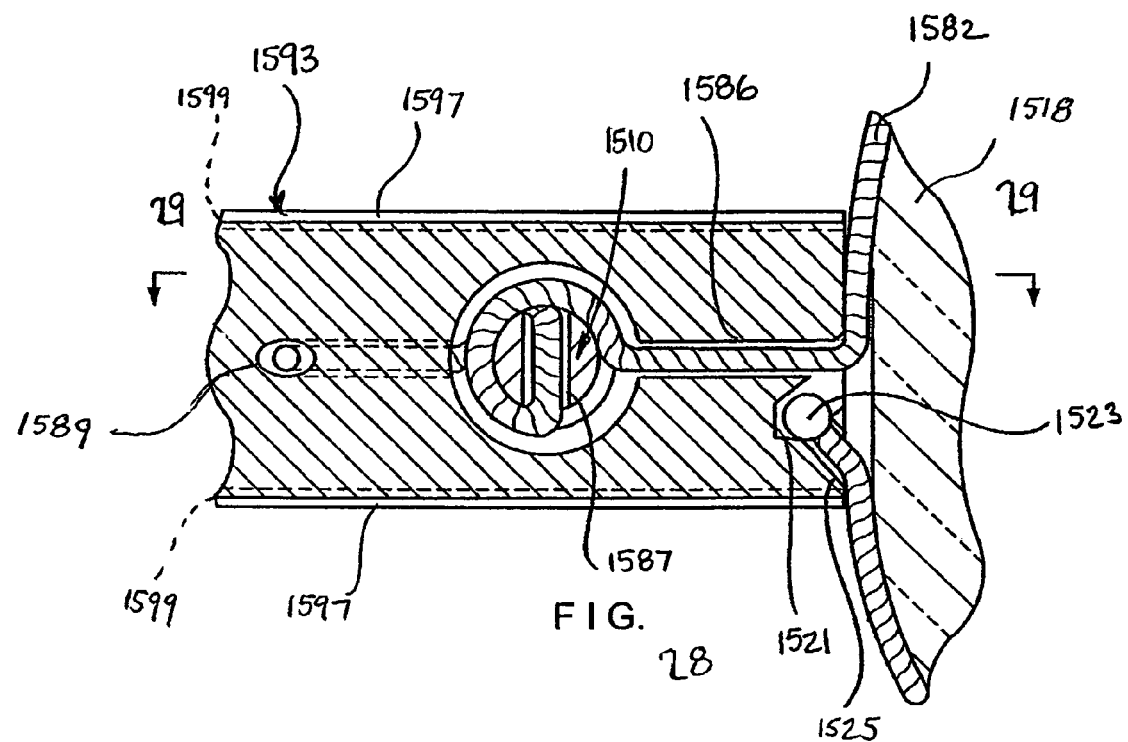
FIG. 28 is a sectioned view generally taken along the line 28-28 in FIG. 26 and reflects a section through the eyewear that is generally parallel to the front view of FIG. 27.

The projection 1580 comprises a first wire passage 1586 (see FIGS. 26 and 28). In the arrangement of FIG. 26, the first wire passage 1586 preferably is not centrally positioned with respect to a vertical dimension of the projection 1580. As shown, the first wire passage 1586 preferably is vertically offset from center to reduce the depth of the projection 1580. In other words, by offsetting the first wire passage 1586, the wire 1586 can extend in a substantially straight line to its position on the spool member 1510. The first wire passage 1586 also is shown extending in a generally horizontal manner. In some arrangements, the first wire passage 1586 can slope downward toward the spool member 1510.

The first wire passage 1586 accommodates the wire 1582, which is secured to the spool member 1510 in any suitable manner. Preferably, the wire 1582 is secured to the spool member 1510 by welding, brazing, soldering, adhering, using mechanically interlocking structures or the like. Most preferably, the wire 1582 extends through a hole 1587 formed through the spool member 1510 and wraps about at least a portion of the spool member 1510.

Figure 29:
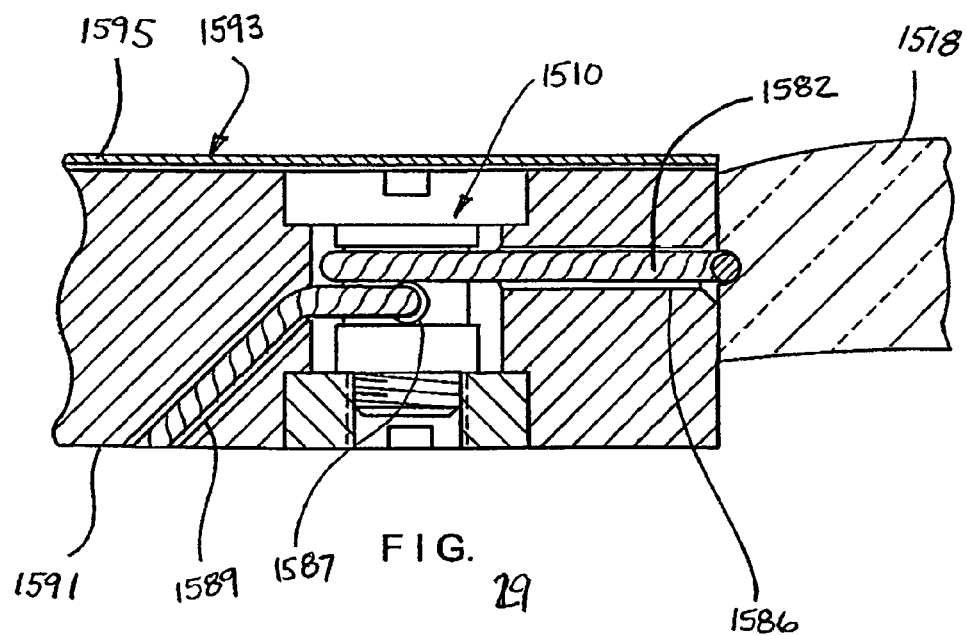
FIG. 29 is a sectioned view generally taken along the line 29-29 in FIG. 28.

With reference to FIGS. 26 and 29, the hole 1587 through the spool member 1510 can be sloped through the spool member 1510 such that the wire 1586 can be aligned with the first wire passage 1586 and with a second wire passage 1589. The second wire passage 1589 preferably extends through a rear surface 1591 of the projection 1580. In this manner, the wire 1582 can be pulled through the projection 1580 before the wire 1586 is tightened and secured by the spool member 1510.

The illustrated projection 1580 also comprises a socket 1521 that receives an end of the wire 1586. This end of the wire 1582 advantageously carries an anchor member 1523. A third passage 1525 extends away from the socket 1521. The third passage preferably extends at an angle such that the wire can have a generally smooth transition to the lens perimeter.

As used herein, an anchor is a generally enlarged portion attached to or integrally formed with the wire. The anchor member 1523 shown in FIG. 28 is generally spherical. The anchor member 1523 can be cubic, rectangular, or the like and can have any suitable configuration, including but not limited to conical and oval. While the illustrated anchor member 1523 does not necessarily complement the shape of the socket 1521, in some arrangements, the anchor member 1523 can be sized and configured to complement the socket 1521. Moreover, instead of the end of the wire being fixed to the anchoring member 1523, the end of the wire simply can be tied in a knot form or expanded in order to lock the end of the wire in a suitably shaped recess formed in the projection 1580. Desirably, the anchor member and the wire (or the knot and the wire) together define a type of stopper knot locking assembly.

Because of the similarities in construction, further description of many the components of the arrangement of FIGS. 25-27 is believed unnecessary and duplicative; however, it should be noted that this arrangement also features a cover 1593. The cover 1593 is designed to be snap fit over a forward surface of the projection 1580. In other words, the cover 1593 is generally u-shaped with two legs 1595 extending rearward from a forward panel 1597. The legs 1595 can include inwardly extending fingers 1599 that grip a portion of the projection 1580. Because of the generally horizontal axis of rotation of the spool member 1510, the cover 1593 snaps into position after the spool member 1510 has been locked in position in the manners described above. Also, it should be mentioned that this arrangement can have one wire end secured to the projection while the other is wrapped on the spool member 1510.

With reference to FIG. 30, a spool member is shown with a pair of wires 1582' connected thereto. As described herein and in the discussions above, spool members can be used to secure one or two wire ends and can be oriented about either a generally vertical or a generally horizontal rotational axis. The arrangement of FIG. 30 generally is configured in a manner similar to that discussed directly above in which a single wire end was secured and the spool member 1510 comprised a generally horizontal axis of rotation. Thus, further description is deemed unnecessary and duplicative. It should be noted, however, that this arrangement allows both ends of the wire to be secured to the spool. More preferably, this arrangement can be used in arrangements having a pair of wire portions extending from another portion of the frame assembly, such as a bridge, for instance. Thus, rotation of the spool member 1510' of FIG. 30 would result in twice the wire movement relative to rotation of the spool member 1510 of FIG. 26.

With reference to FIGS. 31-33, an arrangement is illustrated that features a ratchet and pawl configuration 1600. As is known, a ratchet and pawl configuration generally is a mechanical device that can limit motion to one direction unless a mechanical override is operated. The ratchet is usually a wheel 1602 or gear with slanting teeth 1604. The pawl 1606 is a lever that is generally tangential to the wheel 1602 with one end resting on the teeth 1604. When the wheel 1602 rotates one way, the pawl 1606 slides over the teeth 1604; when the wheel 1602 rotates the other way, the pawl 1606 catches in the teeth 1604.

In the illustrated arrangement, the wheel 1602 is secured to a spool member 1610. The spool member 1610 can have any suitable configuration and, preferably, is similar in construction to the spool members shown and described above. As the illustrated arrangement of FIGS. 31-33 is largely similar to the arrangement of FIGS. 25-29, further description of similar components is deemed unnecessary and duplicative.

With reference to FIG. 33, the wheel 1602 can be secured to the spool member 1610 such that a flange 1612 is interposed between the two. The flange 1612 can be integrally formed with the projection 1680. The wheel 1602 in the illustrated arrangement is secured with threaded fasteners 1614; however, other suitable manners of connecting the wheel to the spool also can be used. Because the wheel 1602 is secured to the spool member 1610, the lower portion of the spool member 1610 need not be threaded and a sleeve 1616 can be threaded into position in the projection 1680 rather than being threaded onto the spool member 1610. In this manner, the sleeve 1616 forms a cover for the opening containing the pawl and ratchet configuration 1600. As such, the sleeve 1616 can be removed to allow the pawl 1606 to easily be disengaged from the wheel 1602.

A set screw 1620 is provided to lock the pawl 1606 into engagement with the wheel 1602 such that the pawl cannot be removed from the wheel 1602 unless the set screw 1620 is removed from the pawl 1606. In other words, the projection 1680 comprises a threaded opening 1622 that intersects a portion of the pawl 1606 when the pawl 1606 is in engagement with the wheel 1602. The set screw 1620 can be screwed into the opening 1622. The opening 1622 can be positioned such that the set screw 1620 will be covered by a cover 1624 in some embodiments. In other arrangements, the set screw 1620 can extend through a lower surface of the projection 1680. Moreover, in some arrangements, the pawl 1606 can be biased or can comprise a leaf-spring type of structure such that the pawl will disengage from the wheel unless the set screw is applying a force to the pawl. Such arrangement would facilitate disassembly but would also increase the risk of undesired loosening over time.

Figure 34:
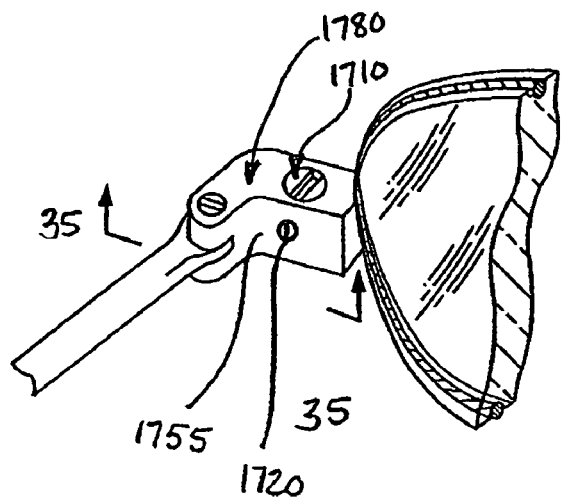
FIG. 34 is an enlarged partial view of an adjustment system arranged and configured in accordance with certain features, aspects and advantages of the present invention and which is similar to the adjustment system shown in FIGS. 31-33.
Figure 35:
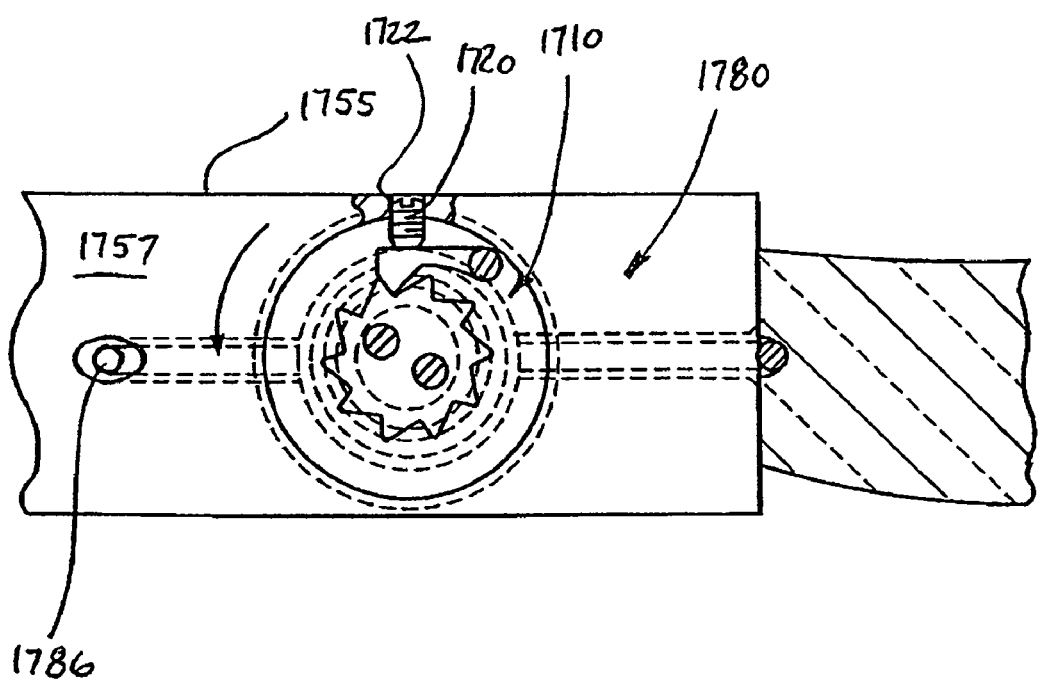
FIG. 35 is a sectioned view generally taken along the line 35-35 in FIG. 34.

With reference now to FIGS. 34 and 35, an arrangement similar to that described in FIGS. 31-33 is shown. In this arrangement, a spool member 1710 comprises a generally vertical axis of rotation. Thus, a set screw 1720 extends through a rear surface 1755 of a projection 1780. In particular, a threaded opening 1722 is formed through the rear surface 1755 and the set screw 1720 can be threaded into this opening 1722. Moreover, as FIG. 35 shows, an end of the wire 1786 preferably extends through a lower surface 1757 of the projection 1780. Such an arrangement reduces the visibility of the opening through which the wire 1786 extends.

Figure 36:
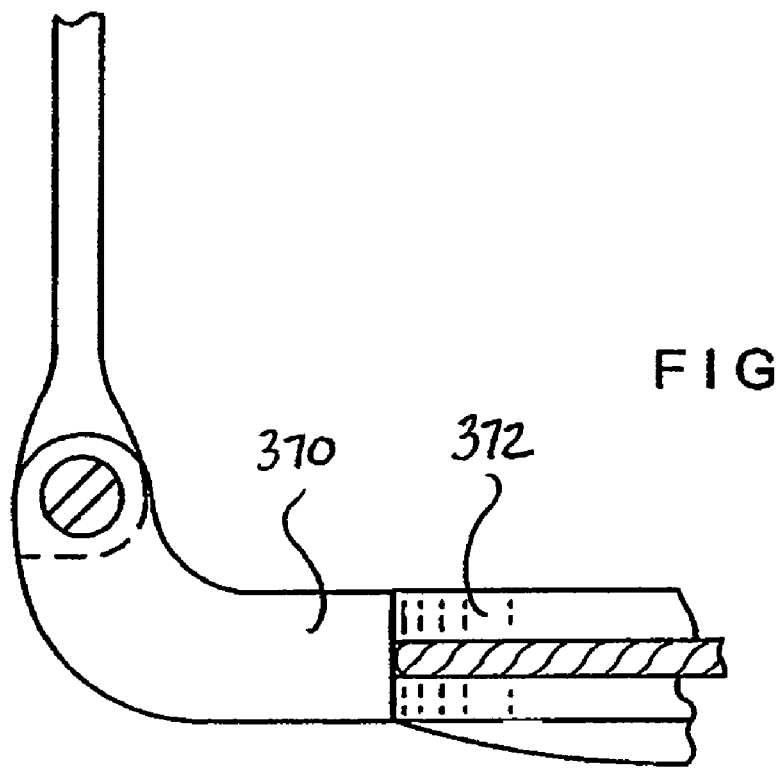
FIG. 36 is a simplified, partial top view of eyewear arranged and configured in accordance with certain features, aspects and advantages of the present invention and illustrating an interface between tension blocks and a lens.
Figure 37:
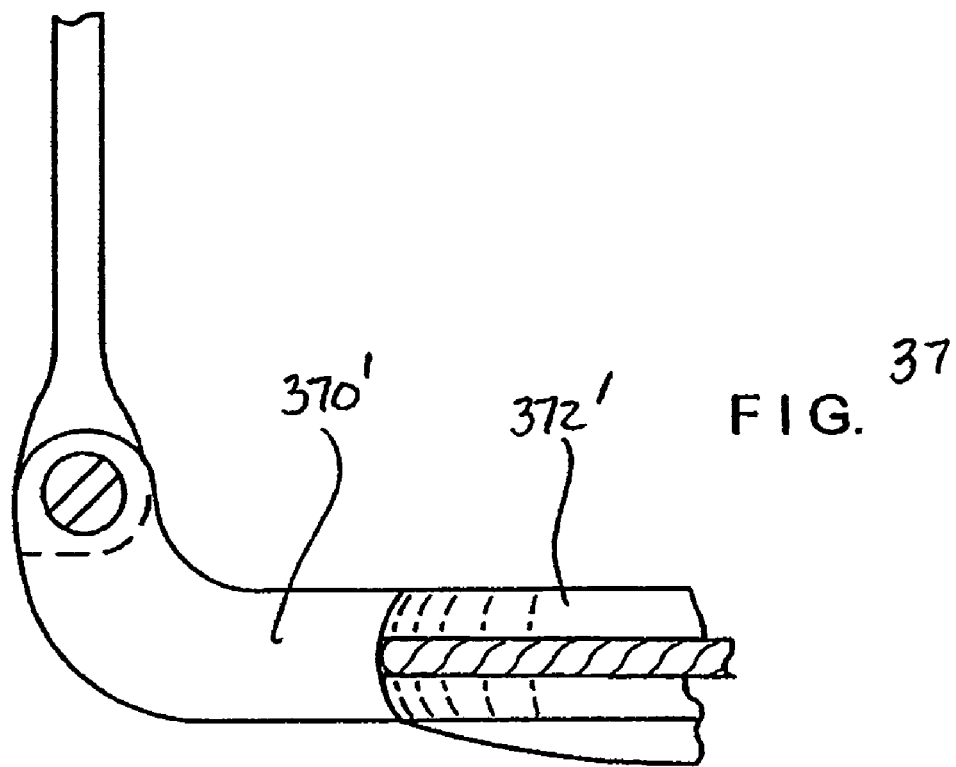
FIG. 37 is another simplified, partial top view of eyewear arranged and configured in accordance with certain features, aspects and advantages of the present invention and illustrating another interface between tension blocks and a lens.

With reference now to FIGS. 36 and 37, a portion of any closing member construction or projection disclosed herein can be configured to have a raised lip or tooth that fits within a portion of the groove in the peripheral surface of the associated lens. The tooth may reduce the likelihood that the closing member will slide off of the peripheral side of the lens. Thus, the tooth is believed to advantageously enhance the stability of the mounting of the closing member. In some arrangements, however, such as those shown in FIGS. 36 and 37, no teeth are provided and the closing member 370, 370' is provided a generally flush connection with the periphery of the associated lens 372, 372'. As also shown in FIGS. 36 and 37, the periphery of the lenses 372, 372' can be generally square or more rounded (compare FIG. 36 to FIG. 37). Preferably, the contour of the abutting surface of the closing member 370, 370' is shaped to complement the peripheral surface of the associated lens 372, 372'.

With reference now to FIGS. 38-43, any of the eyewear described above can receive any of a number of bridge constructions. The bridge constructions facilitate the joining of both lenses. FIGS. 38-43 illustrate four variations of bridge constructions. Other bridge designs also can be used if desired.

Figure 38:
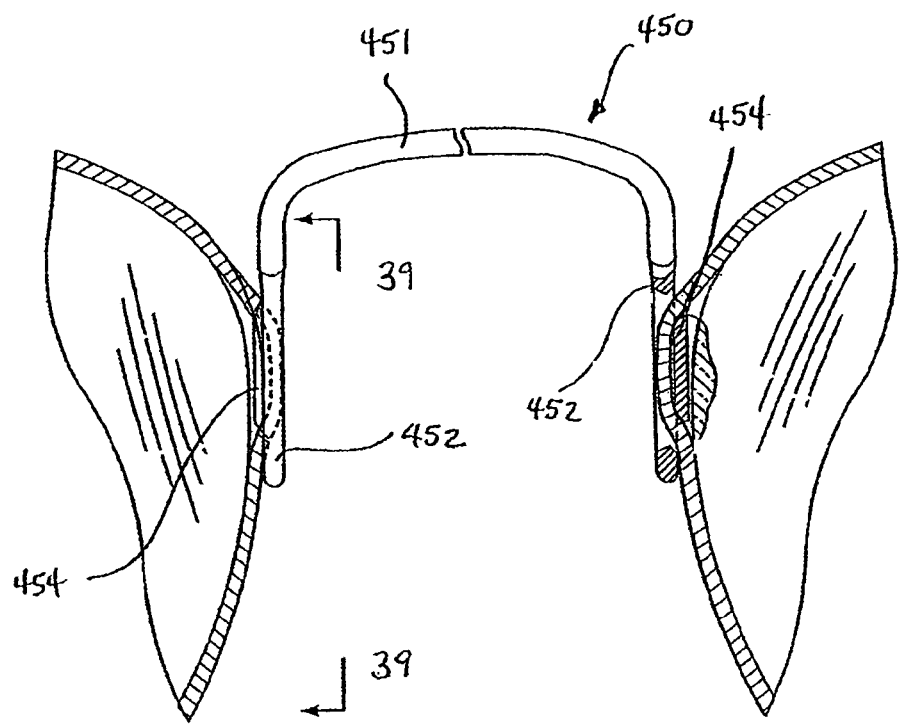
FIG. 38 is an illustration of a bridge construction for eyewear arranged and configured in accordance with some embodiments of the present invention.
Figure 39:
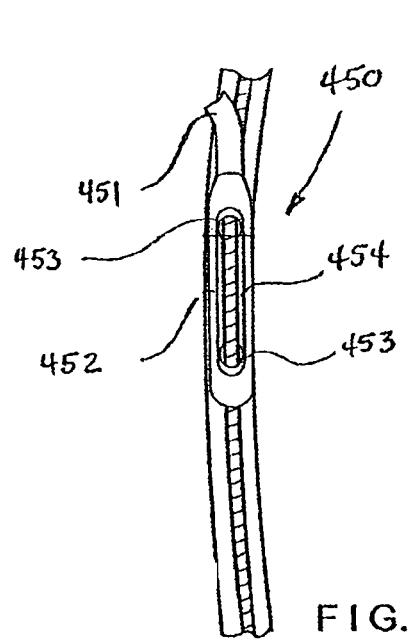
FIG. 39 is a view along the line 39-39 of the bridge construction shown in FIG. 38.

With reference now to FIGS. 38 and 39, a bridge 450 is illustrated therein. The bridge 450 can comprise a central portion 451 and a pair of legs 452. The legs 452 extend generally downward from the central portion 451 and, together with the central portion 451, define a generally inverted U-shaped bridge 450. While other dimension can be practicable, for a robust design, the legs 452 preferably have a thickness (see FIG. 38) that is at least one wire diameter while the legs 452 preferably have a width (see FIG. 39) that is at least two wire diameters. Moreover, the bridge 450 can have any suitable cross-sectional shape, including portions having differing cross-sections. For instance, the central portion 451 can be cylindrical, tubular, rectangular, square, oval or the like. In addition, the legs 452 can be generally flat but other cross-sectional shapes also can be used.

At least one hole 453 preferably is formed in each of the pair of legs 452. In the illustrated arrangement, two holes 453 are positioned in each of the legs 452. In some embodiments three or more holes can be used. Having two holes 453 is believed to improve the ability of the bridge to remain in position once the associated eyewear is fully assembled and in use. Moreover, in frame assembles that featuring fully adjustable lengths (e.g., lenses of substantially different perimeter dimensions can be accommodated), the position of the bridge 450 along the wire can be fully adjusted into a desired position. Similarly, in frame assemblies featuring the ability to accommodate differing shapes but not necessarily different perimeter dimensions, the bridge 450 can be repositioned relative to the lens shape until a desired positioning is achieved.

The holes 453 preferably are greater than one diameter of the wire and less than two diameters of the wire. In some constructions, the holes 453 can be greater than two diameters of the wire, but such sizing may result in an increased width of the legs 452, which may be less desirable in some eyewear configurations.

The holes 453 preferably are formed with a recessed or inset region 454 of the legs 452 extending between the holes 453. The inset region 454 preferably is sized and configured to be accepted within the groove of the associated lens. Such a construction allows at least a portion of the width legs 452, not necessarily including the inset region 454, to abut a surface of the perimeter of the associated lens. Moreover, in the illustrated arrangement, the wire advantageously does not protrude beyond the legs 452. Such a construction aids in the appearance of a rimless look. In some embodiments, however, the wire can extend slightly beyond the surface of leg 452 such that the wire slightly protrudes from the leg 452. In such constructions, the recess 454 can have a decreased dimension or the legs 452 can have a smaller overall dimension.

In use, the wire can be threaded through the holes 453 prior to assembly of the associated wire and lens components. The bridge 450 can be positioned along the lenses as desired and can be secured in position when the wire is closed in a loop. The wire tension can be adjusted in any manner set forth above and with any suitable construction, including those discussed above.

Figure 40:
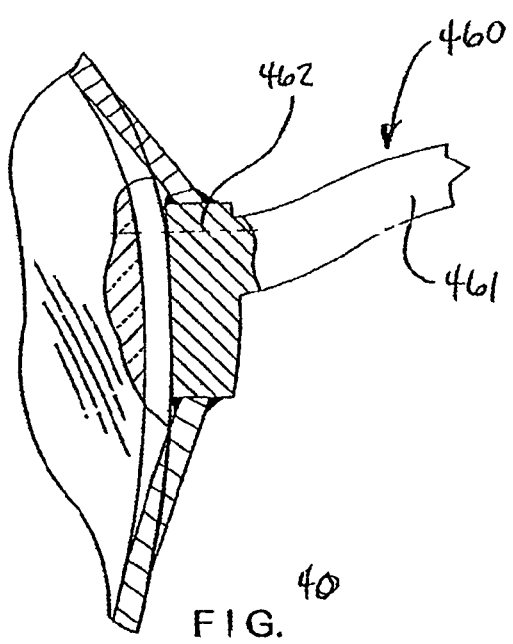
FIG. 40 is an illustration of another bridge construction for eyewear arranged and configured in accordance with some embodiments of the present invention.

With reference now to FIG. 40, a bridge 460 is illustrated therein. The bridge 460 comprises a central portion 461 with a short extension 462 positioned at each end of the central portion 461. In some arrangements, the extensions 462 can be omitted. Moreover, any suitable cross-sectional shapes can be used for the central portion 461 and the extensions 462. In the illustrated arrangement, a pair of wires (or wire portions) are fixed to the extensions 462. The wires (or wire portions) can be fixed in any suitable manner, including but not limited to soldering, welding, adhering, or mechanically interlocking structures. Furthermore, the ends of the wires (or wire portions) can be directly fixed to the central portion 461, if desired. This construction allows the placement of the bridge to be securely fixed relative to the lens when the eyewear is fully assembled. Moreover, this construction facilitates correct alignment of the lens axis because the bridge position is not likely to shift along the length of the wire during or after assembly.

With reference now to FIGS. 41 and 42, a further bridge 470 is illustrated therein. In this arrangement, the bridge 470 generally comprises a central portion 471 and a short extension 472 positioned at each end of the central portion 471. In some arrangements, legs similar to those shown in FIGS. 38 and 39 can be used in place of the extensions 472. Similar to each of the constructions described above, the bridge and its component(s) can have any suitable cross-sectional configuration. Moreover, the cross-sectional configuration can be varied along any portion of the bridge.

A passage 473 preferably extends through at least a portion of each extension 472. In the illustrated arrangement, the passage 473 extends through the full length of the extension 472 but other constructions can feature passages that extend through a limited portion of the extension. Moreover, in some variations, the passage 473 can extend through an end of the central portion 471 and the extensions 472 can be omitted. The passage 473 can have any suitable cross-sectional configuration. In some arrangements, the passage 473 is cylindrical or has an elliptical or oval cross-section. Preferably, at least one lateral dimension of the passage 473 is greater than one diameter of the associated wire. Similarly, the extension 472 preferably is larger than at least two diameters of the associated wire such that a robust construction results. The dimensions of the components can be varied as desired.

With respect to the arrangement of FIGS. 41 and 42, the bridge 470 can be used with eyewear having a fixed wire length or a fully adjustable wire length. The bridge 470 can be moved along the length of the wire to achieve a desired bridge placement. Moreover, the bridge can be easily removed from the wire and be replaced on a different wire, which allows the wire to be replaced as needed or desired. The bridge 470 also advantageously allows the connection to the wire to be substantially hidden when the eyewear is fully assembled, which can be desired in some eyewear constructions. The obscured attachment location further enhances the rimless appearance of the eyewear with which the bridge 470 is used.

With reference to FIG. 43, a further bridge 480 is illustrated therein. In this arrangement, as with those described above, the bridge 480 generally comprises a central portion 481 and a short extension 482 positioned at each end of the central portion 481. In some arrangements, legs similar to those shown in FIGS. 38 and 39 can be used in place of the extensions 482. Similar to each of the constructions described above, the bridge and its component(s) can have any suitable cross-sectional configuration. Moreover, the cross-sectional configuration can be varied along any portion of the bridge.

A passage 483 preferably extends through at least a portion of each extension 482. In the illustrated arrangement, the passage 483 extends through the full length of the extension 482 but other constructions can feature passages that extend through a limited portion of the extension 482. Moreover, in some variations, the passage 483 can extend through an end of the central portion 481 and the extensions 482 can be omitted. The passage 483 can have any suitable cross-sectional configuration. In some arrangements, the passage 483 is cylindrical or has an elliptical or oval cross-section. Preferably, at least one lateral dimension of the passage 483 is greater than one diameter of the associated wire. Similarly, the extension 482 preferably is larger than at least two diameters of the associated wire such that a robust construction results. The dimensions of the components can be varied as desired.

While the bridge 480 of FIG. 43 is similar to the bridge 470 of FIG. 41, the bridge 480 of FIG. 43 further includes a wire locking mechanism 485. The locking mechanism 485 comprises a projection 486 that extends through an opening 487. The projection 486 has a length sufficient to contact a portion of the wire that passes through the passage 483. In some arrangements, the projection is formed on a leaf 488. In further arrangements, another projection 489 can be positioned on an opposite side of the leaf 488. This opposing projection 489 preferably is sized and configured to fit within the groove formed in the peripheral surface of the lens. If the portion of the leaf 488 carrying the projections 486, 489 is slightly offset, as in the illustrated arrangement, the opposing projection can be smaller than the diameter of the wire or the depth of the groove in the lens.

The leaf 488 can be secured to the extension 482 with the projection 486 positioned in the opening 487 and the opposing projection 489 extending toward the ultimate position of the lens. Thus, as the lens is positioned and tightened in its location adjacent to the extension 482, the lens contacts the opposing projection 489, which urges the projection 486 through the opening 487 and into engagement with the wire.

Preferably a recess 490 is formed in the passage 483 to allow the wire to be offset into the recess 490. In some arrangements, the recess 490 is formed when the opening 487 is formed through the extension 482. The wire preferably is sufficiently flexible to allow the wire to be offset into the recess when the eyewear is being assembled and the tension is being adjusted on the wire.

Although the present invention has been disclosed in the context of certain preferred embodiments, examples and variations, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. For instance, the exterior shape and dimensions of the closing members, housings or projections can be any suitable shape or configuration, including the use of curved or straight surfaces in the place of straight or curved surfaces so long as the wire and/or any tensioning components can be properly attached thereto, positioned there within or associated therewith. Moreover, any of the closing members, housings or projections described herein can have legs or projections that extend along a portion of the lens surface, for aesthetic reasons and/or to add additional desired support to the assembly by increasing the contact area between the component and the respective lens.

It is also contemplated that various combinations or subcombinations of the specific features and aspects of the embodiments may be made and still fall within the scope of the invention. It should be understood that various features and aspects of the disclosed embodiments can be combined with or substituted for one another in order to form varying modes of the disclosed invention. Moreover, some variations that have been described with respect to one embodiment and not another embodiment can be used with such other embodiments. For instance, many of the embodiments features spool members with a hole through which the wire is threaded. With respect to some of the embodiments featuring spool members, the wire is disclosed as being soldered to the spool member, for instance. It is intended that either arrangement can be implemented for any spool member embodiment. Many other variations also have been described herein and cross-application is intended where physically possible. Thus, it is intended that the scope of the present invention herein disclosed should not be limited by the particular disclosed embodiments described above, but should be determined only by a fair reading of the claims that follow.

What is claimed is:

1. Eyewear comprising:
   a lens;
   a wire having a first end and a second end and substantially encircling the lens;
   a housing;
   a spool positioned at least partially within the housing, at least one of the first and second ends of the wire being connected to the spool such that the spool is adapted to increase the tension in the wire when rotated in a first direction and to decrease tension in the wire when rotated in a second direction;
   the spool comprising a segment having radially-extending teeth, a pawl member disposed adjacent the teeth of the spool; and
   a securing member being disposed adjacent the pawl member, the securing member being moveable toward and away from the pawl member such that the securing member can inhibit movement of the pawl member and the pawl member not inhibiting rotation of the spool when the securing member is spaced apart from the pawl member and inhibiting rotation of the spool when the securing member abuts the pawl member.

2. The eyewear of claim 1, wherein the securing member comprises a set screw.

3. The eyewear of claim 1, wherein the spool is completely positioned within the housing.

4. The eyewear of claim 1, wherein one of the first and second ends extends from the spool to an outer surface of the housing at a location away from the lens.

5. The eyewear of claim 1, wherein the lens comprises a circumferential groove and at least a portion of the wire is disposed in the groove.

6. Eyewear comprising a lens having a groove, a wire disposed in the groove, the wire substantially encircling the lens and having a first end and a second end, at least one of the first end and the second end extending into a housing, the housing being positioned generally adjacent to the lens, the housing containing at least a portion of a spool, at least one of the first and second ends of the wire contacting the spool, the spool being rotatable about an axis in a first direction and a second direction such that rotation in the first direction increases tension on the wire and rotation in the second direction decreases tension on the wire.

7. The eyewear of claim 6 further comprising a ratcheting member that is connected to the spool, a pawl adapted to selectively inhibit rotation of the spool through selective contact with the ratcheting member.

8. The eyewear of claim 7 further comprising a securing member that secures the pawl in an abutting relation with the ratcheting member.

9. The eyewear of claim 8, wherein the securing member comprises a set screw.

10. The eyewear of claim 9, wherein the ratcheting member and the pawl are generally configured to limit rotation of the spool to one direction.

11. The eyewear of claim 6, wherein the spool is completely positioned within the housing.

12. The eyewear of claim 6, wherein one of the first and second ends extends from the spool to an outer surface of the housing at a location away from the lens.

13. Eyewear comprising a lens having a groove, a wire having a first end and a second end, the wire disposed in the groove and substantially encircling the lens, a housing being positioned adjacent to the lens, at least one of the first end and the second end of the wire extending into the housing, and means for increasing tension on the wire being positioned within the housing and directly contact with the at least one of the first end and the second end of the wire.

14. The eyewear of claim 13, wherein the means for increasing the tension on the wire comprises a ratcheting spool, a pawl positioned adjacent to the ratcheting spool, the pawl being adapted to selectively substantially inhibit rotation of the ratcheting spool in one direction, a securing member positioned generally adjacent to the pawl, the securing member adapted to secure the pawl against the ratcheting spool to inhibit rotation of the ratcheting spool when the securing member is in a first position and the securing member, and at least one of the first and second ends of the wire is connected to the ratcheting spool such that rotation of the ratcheting spool increases the tension on the wire.

15. The eyewear of claim 13, wherein the means for increasing tension on the wire comprises a rotating spool.

16. The eyewear of claim 13, wherein the means for increasing tension on the wire comprises a member having an axially extending threaded surface and the member capable of axial movement within the housing to increase tension on the wire.

* * * * *